United States Patent [19]

Matsuo et al.

[11] Patent Number: 5,631,377
[45] Date of Patent: May 20, 1997

[54] POLYIMIDE INTERMEDIATES

[75] Inventors: Mitsunori Matsuo; Tsutomu Ishida; Akio Karasawa, all of Kanagawa-ken; Keizaburo Yamaguchi, Chiba-ken; Akihiro Yamaguchi, Kanagawa-ken, all of Japan

[73] Assignee: Mitsui Toatsu Chemicals, Inc., Tokyo, Japan

[21] Appl. No.: 450,150

[22] Filed: May 26, 1995

Related U.S. Application Data

[62] Division of Ser. No. 357,193, Dec. 13, 1994, Pat. No. 5,508,377.

[30] Foreign Application Priority Data

| Dec. 21, 1993 | [JP] | Japan | 5-322631 |
| Dec. 28, 1993 | [JP] | Japan | 5-335511 |
| Jul. 12, 1994 | [JP] | Japan | 6-160313 |
| Jul. 13, 1994 | [JP] | Japan | 6-160960 |

[51] Int. Cl.⁶ .................... C07C 255/60; C07D 213/38
[52] U.S. Cl. ........................... 546/296; 558/418
[58] Field of Search ........................ 546/296; 558/418

[56] References Cited

FOREIGN PATENT DOCUMENTS

| 233069 | 8/1987 | European Pat. Off. |
| 333406 | 9/1989 | European Pat. Off. |
| 397023 | 11/1990 | European Pat. Off. |
| 62-116563 | 5/1987 | Japan |
| 62-205124 | 9/1987 | Japan |
| 3-17129 | 1/1991 | Japan |

*Primary Examiner*—Richard L. Raymond
*Attorney, Agent, or Firm*—Burns, Doane, Swecker & Mathis

[57] ABSTRACT

This invention relates to a novel polyimide or polyimide copolymer having excellent heat resistance and greatly improved processability, and has a novel aromatic diamino compound used for the polyimide, a preparation process thereof, a polyimide-based resin composition comprising the polyimide or polyimide copolymer and a fibrous reinforcement, a process for preparing the resin composition, an injection molded article of the resin composition.

The polyimide comprise a requisite structural unit having one or more recurring structural units of the formula:

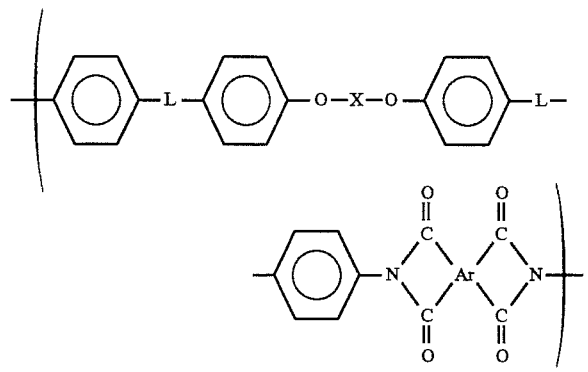

wherein L is an oxygen atom, carbonyl, isopropylidene or hexafluoroisopropylidene, and X is

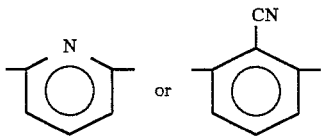

, and Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

The polyimide or polyimide copolymer is outstanding in melt-flow stability, and has greatly improved processability and excellent heat resistance. Consequently, the polyimide or polyimide copolymer can be applied to structural materials, and electic . electronic appliances.

3 Claims, 4 Drawing Sheets

POLYIMIDE INTERMEDIATES

This application is a divisional of application No. 08/357,193, filed Dec. 13, 1994, now U.S. Pat. No. 5,508,377.

BACKGROUND OF THE INVENTION

1. Field of the Invention

The present invention relates to a novel polyimide and a process for preparing the polyimide, and a novel aromatic diamino compound used for preparing polyimide and a process for preparing the aromatic diamino compound. More particularly the invention relates to thermoplastic polyimide having excellent heat resistance and a preparation process thereof and further relates to a polyimide based resin composition comprising said polyimide and a fibrous reinforcement.

A novel aromatic diamino compound of the formula (3-1) having a pyridine skeleton and a novel aromatic diamino compound represented by the formula (3-2) having a cyano radical are useful as the raw material of polyimide in the invention and can also be applied to the raw material of polyamide, polyimide, polyamideimide, bismaleimide and epoxy resin.

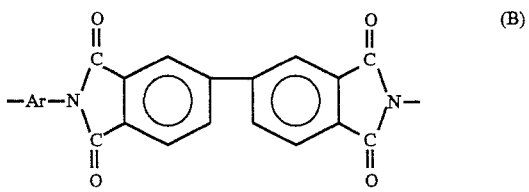

wherein Ar is

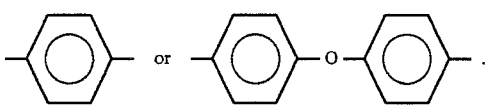

The resin itself has no melt-flowability and cannot be extruded. Consequently, the resin has a problem that the resin film can be obtained by casting alone.

Japanese Laid-Open Patent SHO 62-205124 has disclosed thermoplastic polyimide which has improved glass transition temperature, melt-flowability and processability and has recurring structural units of the formula (C):

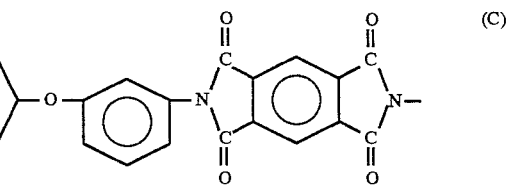

2. Related Art of the Invention

Conventionally, polyimide has been widely used in the field of molding materials, composite materials and electric.electronic appliances because polyimide has excellent heat resistance and additionally is excellent in mechanical properties, chemical resistance, flame retardance, electrical properties and other characteristics.

For example, a representative polyimide which has been known is Kapton and Vespel (Trade Mark of E. I. Du Pont de Nemours & Co.) which have recurring structural units of the formula (A):

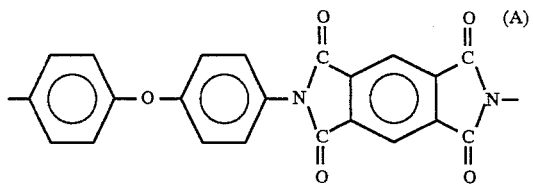

The polyimide, however, is insoluble and infusible and thus must be molded by using a specific technique such as sinter molding by way of polyamic acid precursor. Such problem leads to difficulty in processing and the process is difficult to provide articles having a complex shape. Consequently, finishing operation such as cutting is additionally required in order to obtain satisfactory articles and causes a serious defect of high processing cost.

Similarly, another type of polyimide which has been generally known as a film forming resin is Upilex (Trade Mark of Ube Industries Co.) which has recurring structural units represented by the formula (B):

The polyimide has good melt-flowability and can be processed by injection molding. The polyimide, however, is essentially crystalline and thus crystallization proceeds with heat treatment under specific conditions. When once crystallized, processing temperature above the melting point of the polymer (390° C. or more in the case of the polyimide/ is required for melting the resin again. Softness, that is, flexibility of polymer itself is an important factor for film utilities of polyimide and other polymers.

A crystallized film has insufficient flexibility and is liable to cause fracture or micro-cracks by external force.

From the viewpoint of the above problems, an essentially amorphous and thermoplastic polyimide resin which leads to no crystallization after melt-processing and has flexibility is desired in the field of use which requires substantially no crystallization.

In order to improve such defect of polyimide, a process for improving the diamine component of materials has been tried. For example, a process for controlling glass transition temperature and melt-flowability of polyimide has been carried out by exchange of a bonding radical in a monomer unit, extension of a polymer chain or formation of a bent structure.

For example, as to the bent structure of the polymer chain, polyimide derived from 3,3'-diaminobenzophenone and 3,3', 4,4'-benzophenonetetracarboxylic dianhydride has been developed by NASA as a thermoplastic polyimide LARC-TPI.

The polyimide, however, is still insufficient in melt-flowability, though excellent in heat resistance and adhesion. Consequently, the polyimide is now used primarily as an adhesive.

Various structures of polyimide has also been proposed concerning the process for extending the polymer chain.

However, the structure which satisfies the whole conditions has not yet been obtained because of reduction in physical properties or other reasons.

Polyimide having a pyridine skeleton has been examined in the investigation of amino compounds as a monomer of such polyimide. Japanese Laid-Open Patent SHO 62-116563 has disclosed polyimide obtained by using bis (aminophenoxy)pyridine as a diamine component. However, polyimide prepared by using the compound as a monomer is affected by a short length of monomer units in the polymer chain and leads to insufficient melt-flowability and difficult processing.

Concerning polyimide having a cyano radical, Japanese Laid-Open Patent HEI 3-17129 has disclosed polyimide prepared from bis(aminophenoxy)benzonitrile as a monomer. Polyimide having a cyano radical in the polymer chain exhibits high heat resistance. However, the short length of the monomer units in the polymer chain leads to insufficient melt-flowability and difficulty in processing.

Polyimide which has nitrogen atoms in the polymer chain and is prepared by using diamine of a long molecular chain as a monomer has not yet been fully known on the properties such as heat resistance, processability, mechanical feature and crystallinity.

SUMMARY OF THE INVENTION

One object of the invention is to provide essentially thermoplastic polyimide which has good processability in addition to exhibiting the substantially excellent heat resistance of polyimide and aromatic diamine which is useful as a raw material of the thermoplastic polyimide.

Another object of the invention is to provide polyimide which has very excellent heat-resistance and can fully satisfy flexibility and processability, and an aromatic diamino compound which is useful as a raw material of the polyimide resin.

As a result of an intensive investigation in order to achieve the above objects, the present inventors have found that polyimide comprising as a monomer component a long-chain aromatic diamine of a specific structure having specific divalent organic radicals which bond four benzene rings and one pyridine ring is an essentially thermoplastic polyimide having excellent processability in addition to various substantial properties of polyimide, and that polyimide comprising as a monomer component a long-chain aromatic diamine of a specific structure having specific divalent organic radicals which bond four benzene rings and one benzonitrile ring is an essentially thermoplastic polyimide having excellent processability and very high heat resistance. Thus the present invention has been completed.

That is, one aspect of the invention is as follows.

(1) A polyimide comprising a requisite structural unit consisting of one or more recurring structural units represented by the formula (1):

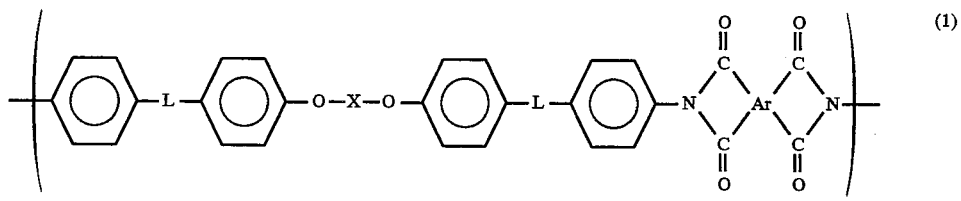

wherein L is an oxygen atom, carbonyl, isopropylidene or hexafluoroisopropylidene, and X is

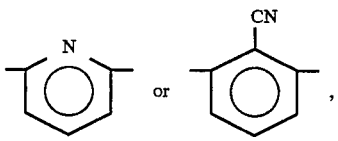

and Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

(2) A polyimide comprising a requisite structural unit consisting of one or more recurring structural units represented by the formula (1):

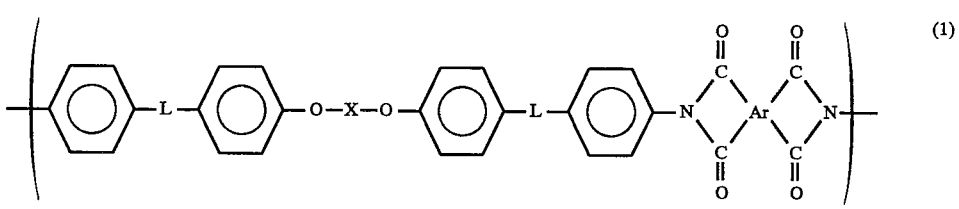

wherein L, X and Ar are the same as above, and having at the polymer chain end thereof an aromatic ring which is essentially unsubstituted or substituted with a radical having no reactivity with amine or dicarboxylic anhydride.

(3) The polyimide of the above (1) or (2) comprising a requisite structural unit of one or more recurring structural units represented by the formula (1-1):

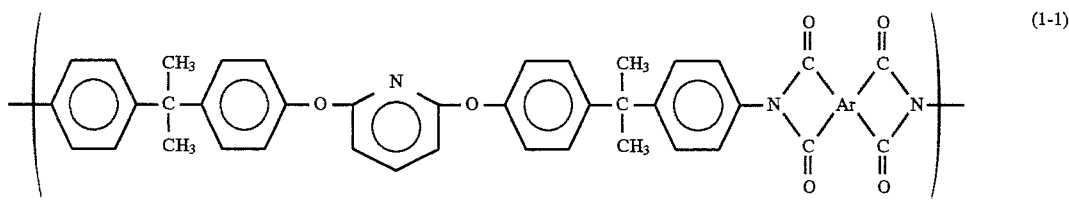
(1-1)

wherein Ar is the see as in the formula (1).

(4) The polyimide of the above (1) or (2) comprising a requisite structural unit of one or more recurring structural units represented by the formula (1-2):

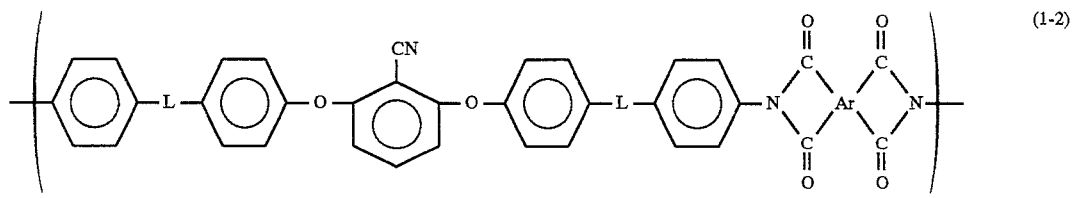
(1-2)

wherein L and Ar are the same as in the formula (1).

(5) Polyimide or a polyimide copolymer comprising a requisite structural unit consisting of 1~100 mol % of recurring structural units represented by the formula (1):

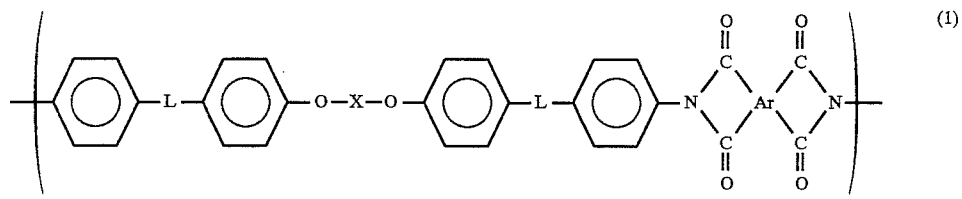
(1)

wherein L, X and Ar are the same as above, and 99~0 mol % of recurring structural units represented by the formula (2):

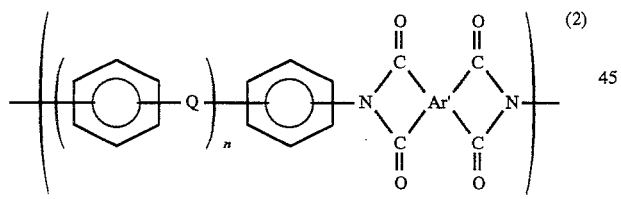
(2)

wherein n is an integer of 0 to 6; Q is a direct fond, —O—, —S—, —CO—, —SO$_2$—, —CH$_2$—, —C(CH$_3$)$_2$— or —C(CF$_3$)$_2$—, and when two or more bonding radicals Q connect aromatic rings to each other, the bonding radicals Q can be the same or different; and Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member; or polyimide or a polyimide copolymer having at the polymer chain end a radical which is essentially unsubstituted or substituted with a radical having no reactivity with amine or dicarboxylic anhydride.

(6) A preparation process of a polyimide having a requisite structural unit consisting of one or more recurring structural units represented by the formula (1):

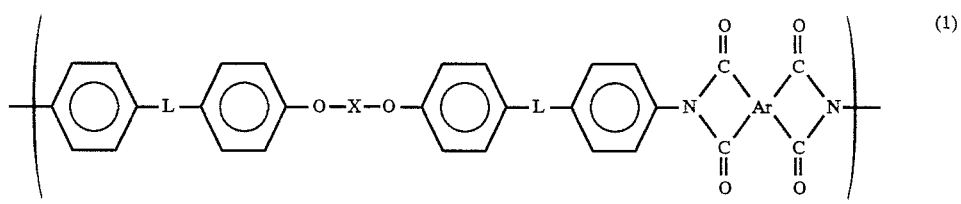
(1)

wherein L, X and Ar are the same as above, comprising reacting aromatic diamine consisting essentially of one or more aromatic diamino compounds represented by the formula (3):

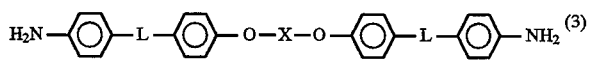

wherein L is an oxygen atom, carbonyl, isopropylidene or hexafluoroisopropylidene and X is

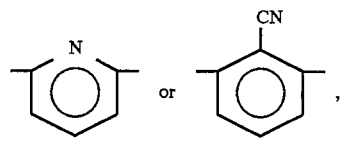

with tetracarboxylic dianhydride essentially represented by the formula (4):

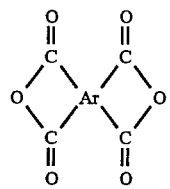

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resultant polyamic acid.

(7) A preparation process of a polyimide having a requisite structural unit consisting of one or more recurring structural units represented by the formula (1):

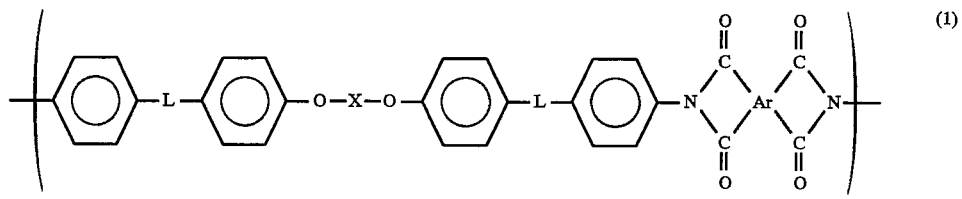

wherein L, X and Ar are the same as above and having at the polymer chain end thereof an aromatic ring which is essentially unsubstituted or substituted with a radical having no reactivity with amine or dicarboxylic anhydride, comprising reacting aromatic diamine consisting essentially of one or more aromatic diamino compounds represented by the formula (3):

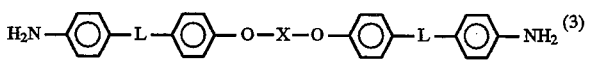

wherein L and X are the same as above, with tetracarboxylic dianhydride essentially represented by the formula (4):

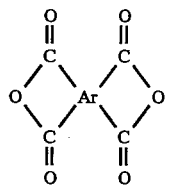

wherein Ar is the same as above, in the presence of aromatic dicarboxylic anhydride represented by the formula (5):

wherein Z is a divalent radical having 6 to 15 carbon atoms and being selected from the group consisting of a monoaromatic radical, condensed polyaromatic radical and noncondensed polyaromatic radical having aromatic radicals connected to each other with a direct bond or a bridge member, or aromatic monoamine represented by the formula (6):

wherein $Z_1$ is a monovalent radical having 6 to 15 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resultant polyamic acid.

(8) A preparation process of polyimide or a polyimide copolymer of the above (5), comprising reacting 1~0.01 parts by mole of aromatic diamine represented by the formula (3):

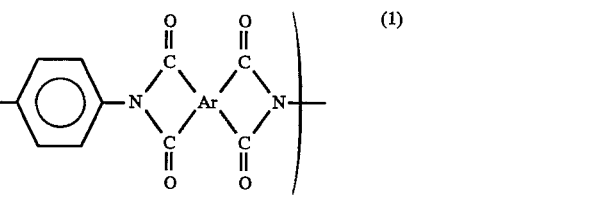

wherein L and X are the same as above, with 1~0.01 parts by mole of tetracarboxylic dianhydride essentially represented by the formula (4):

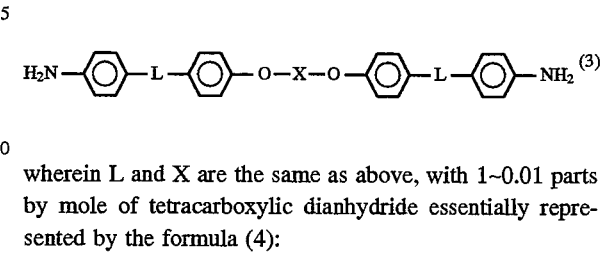

wherein Ar is the same as above, and further reacting 0~0.99 parts by mole of one or more aromatic diamines represented by the formula (9):

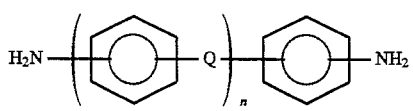
(9)

wherein n is an integer of 0~6, and Q is a direct bond, —O—, —S—, —CO—, —SO$_2$—, —CH$_2$—, —C(CH$_3$)— or —C(CF$_3$)$_2$—, and when two or more bonding radicals Q connect aromatic rings to each other, the bonding radicals Q can be the same or different with 0~0.99 parts by mole of tetracarboxylic dianhydride represented by the formula (10):

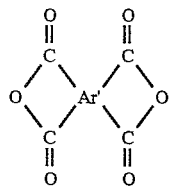
(10)

wherein Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

(9) A preparation process of polyimide or a polyimide copolymer of the above (8), comprising carrying out the above reaction in the presence of 0.001~1.0 mol of aromatic dicarboxylic anhydride represented by the formula (5):

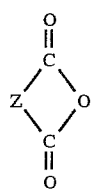
(5)

wherein Z is the same as above, for 1 mol of total aromatic diamine, or in the presence of 0.001~1.0 mol of aromatic monoamine represented by the formula (6)

Z$_1$—NH$_2$  (6)

wherein Z$_1$ is the same as above, for 1 mol of total tetracarboxylic dianhydride; and thermally or chemically imidizing the resultant polyamic acid.

Further aspects of the invention relate as follows to novel aromatic compounds which can be used as a monomer of polyimide in the invention.

(10) An aromatic diamino compound represented by the formula (3):

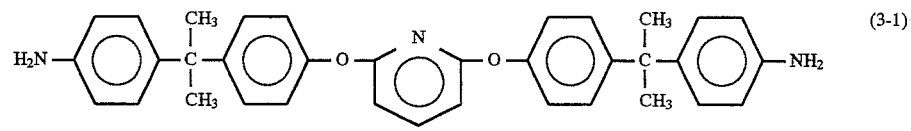
(3)

wherein L and X are the same as above.

Following diamino compounds are preferred in particular.

(11) An aromatic diamino compound represented by the formula (3-1):

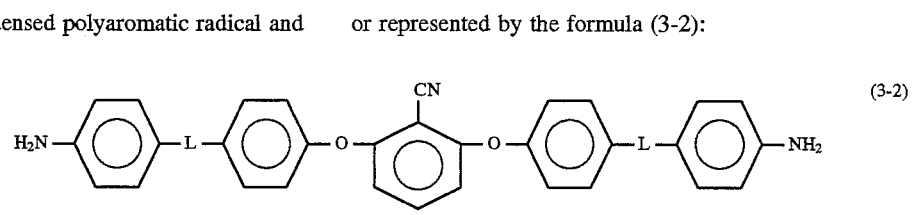
(3-1)

or represented by the formula (3-2):

(3-2)

wherein L is the same as in the formula (3).

(12) A preparation process of an aromatic diamino compound represented by the formula (3):

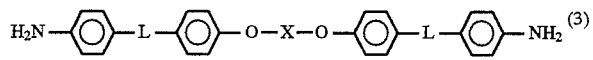
(3)

wherein L and X are the same as above, comprising carrying out condensation of a hydroxyl-containing aromatic amine compound represented by the formula (7):

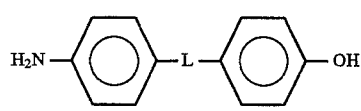
(7)

wherein L is an oxygen atom, carbonyl, isopropylidene or hexafluoroisopropylidene, with a compound represented by the formula (8):

Y—X—Y  (8)

wherein X is

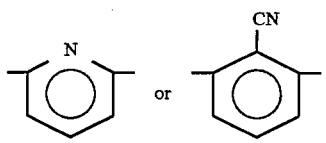

and Y is a halogen atom, in an aprotic polar solvent in the presence of a base.

Still further aspects of the invention relate to polyimide based resin compositions and polyimide articles.

(13) A polyimide based resin composition comprising 100 parts by weight of polyimide or a polyimide copolymer of the above (5) and 5 to 70 parts by weight of a fibrous reinforcement selected from carbon fiber, glass fiber, aromatic polyamide fiber and potassium titanate fiber.

(14) An injection molded article obtained from the polyimide based resin composition.

(15) A polyimide film comprising polyimide or the polyimide copolymer of the invention.

Polyimide or the polyimide copolymer obtained by the invention has excellent heat resistance, is outstanding in melt-flow stability, has greatly improved processability, and can be applied to structural materials.

DETAILED DESCRIPTION OF THE INVENTION

Figure 1:
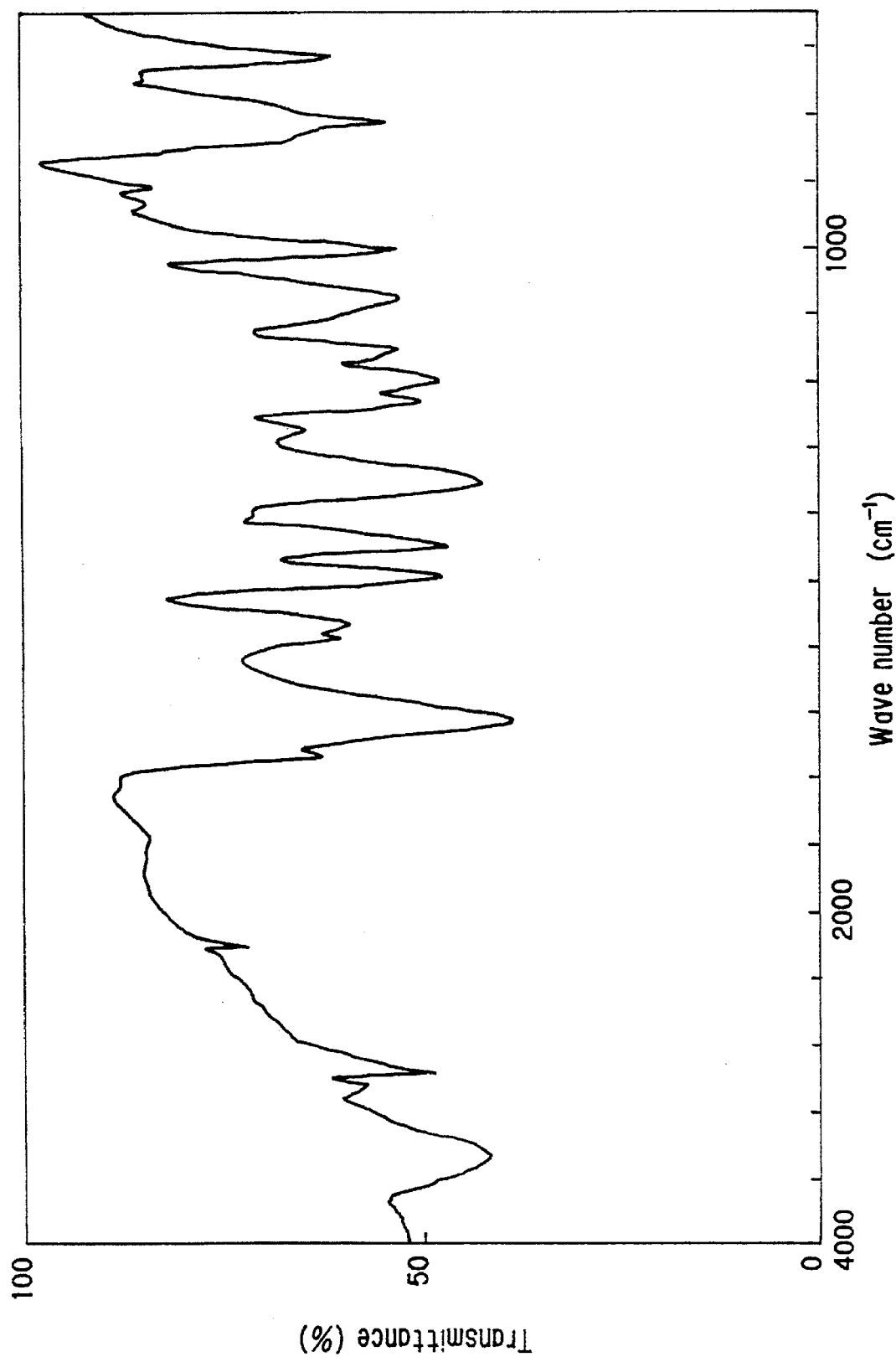
FIG. 1 is an infrared absorption spectrum atlas of the polyimide powder obtained in Example 4.

Polyimide of the invention comprises a requisite structural unit consisting of one or more recurring structural units represented by the formula (1):

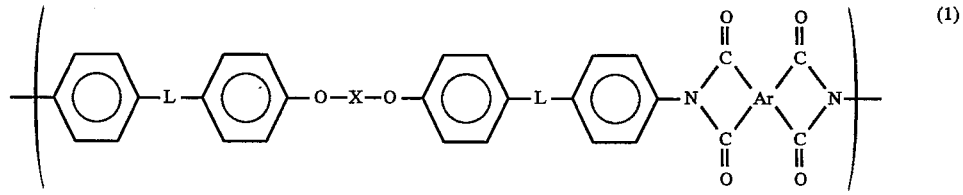

wherein L, X and Ar are the same as above.

Particularly preferred polyimide comprises a requisite structural unit consisting of recurring structural units represented by the formula (1-1):

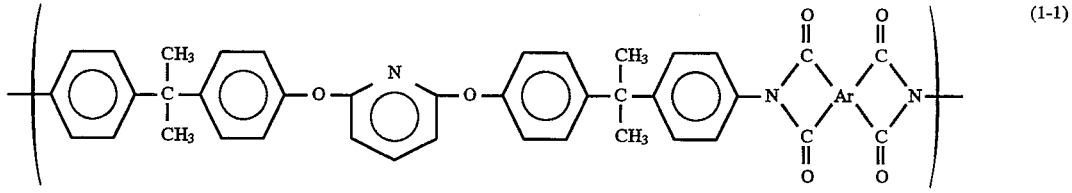

wherein Ar is the same as above, or one or more recurring structural units represented by the formula (1-2):

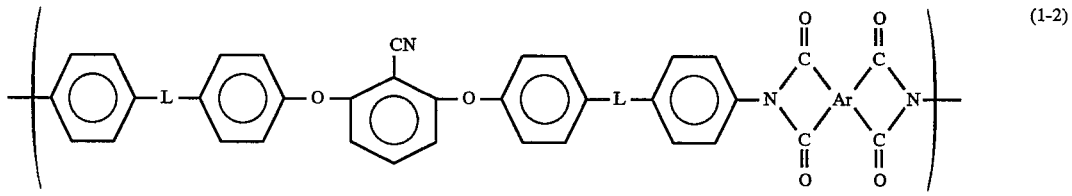

wherein L and Ar are the same as above.

Polyimide having the recurring structural units represented by the above formula (1-1) is particularly excellent in melt flowability and has good injection molding ability and high extrusion forming ability.

Polyimide having recurring structural units represented by the above formula (1-2) is particularly excellent in heat resistance and has a high glass transition temperature.

Further, polyimide or a polyimide copolymer of the invention comprises a requisite structural unit consisting of 1~100 mol % of recurring structural units represented by the above formula (1) and 99~0 mol % of recurring structural units represented by the formula (2):

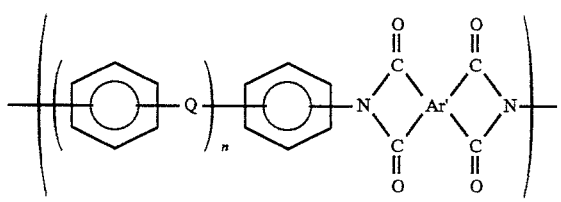

wherein n, Q and Ar' are the same as above. The polyimide copolymer comprises the recurring structural units represented by the formula (1) in a proportion of preferably 50 mol % or more, more preferably 70 mol % or more.

Polyimide or the polyimide copolymer can also have at the polymer chain end an aromatic ring which is essentially unsubstituted or substituted with a radical having no reactivity with amine or dicarboxylic anhydride.

Polyimide having recurring structural units represented by the above formula (1) can be prepared by reacting aromatic diamine essentially consisting of one or more aromatic diamino compounds represented by the formula (3):

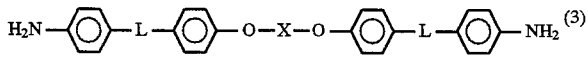

wherein L and X are the same as above, with tetracarboxylic dianhydride essentially represented by the formula (4):

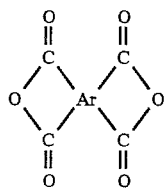

wherein Ar is the same as above, and thermally or chemically imidizing resultant polyamic acid.

The aromatic diamino compound used for preparing polyimide of the invention is aromatic diamine represented by the formula (3):

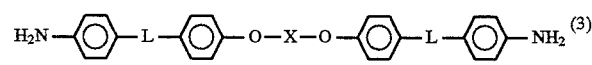

wherein L and X are the same as above. A preferred aromatic diamino compound has the formula (3-1) which can be referred to as 2,6-bis[4-(4-amino-α,α-dimethylbenzyl)phenoxy]pyridine :

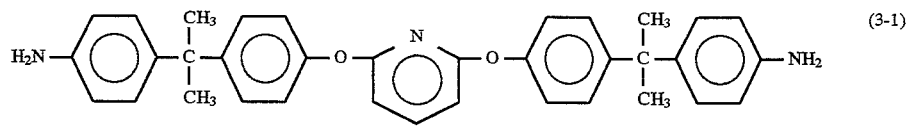

or is represented by the formula (3-2):

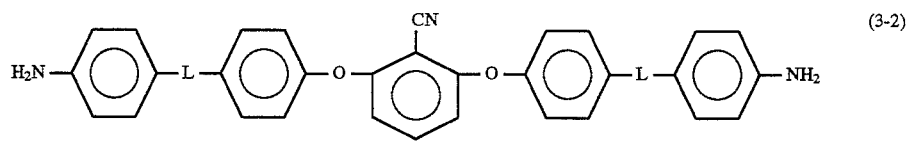

wherein L is the same as above for example, when L is isopropylidene, the compound can be referred to as 2,6-bis[4-(4-amino-α,α-dimethylbenzyl)phenoxy]benzonitrile, when L is hexafluoroisopropylidene, the compound can be referred to as 2,6-bis[4-(4-amino-α,α-bistrifluoromethylbenzyl)phenoxy]benzonitrile, when L is an oxygen atom, the compound can be referred to as 2,6-bis[4-(4-aminophenoxy)phenoxy]benzonitrile, and when L is a carbonyl, the compound can be referred to as 2,6-bis[4-(4-aminobenzoyl)phenoxy]benzonitrile.

Aromatic diamine above can be prepared by condensation of a hydroxyl-containing aromatic amino compound represented by the formula (7):

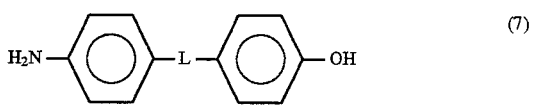

wherein L is the same as above, and a compound represented by the formula (8):

Y—X—Y (8)

wherein X and Y are the same as above, in an aprotic polar solvent in the presence of a base.

Aromatic diamine of the invention has four benzene rings and one pyridine skeleton or benzonitrile nucleus. Polyimide prepared by using the aromatic diamine as a monomer is amorphous and has been found to have excellent flowability at high temperature and good processing ability.

Hereinafter, preparation process of aromatic diamine of the invention will be practically illustrated.

The hydroxyl-containing aromatic compound which can be used for the raw material of aromatic diamine in the invention is represented by the formula (7):

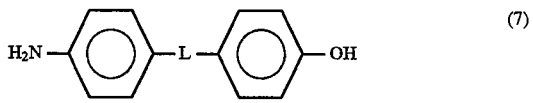

wherein L is the same as above. Exemplary compounds include, for example, 4-amino-4'-hydroxydiphenyl ether, 2-(4-aminophenyl)-2-(4'-hydroxyphenyl)propane, 2-(4-aminophenyl)-2-(4'-hydroxyphenyl) hexafluoropropane, and 4-amino-4'-hydroxybenzophenone.

2-(4-Aminophenyl)-2-(4'-hydroxyphenyl)propane is particularly preferred.

The compound represented by the formula (8) is dihalogenopyridine which is represented by the formula (8-1):

wherein Y is a halogen atom, or dihalogenobenzonitrile which is represented by the formula (8-2):

wherein Y is a halogen atom.

Exemplary dihalogenopyridine includes 2,6-dichloropyridine, 2,6-dibromopyridine and 2,6-diiodopyridine. 2,6-Dichloropyridine is preferably used in view of the availability of raw materials.

Exemplary dihalogenobenzonitrile includes 2,6-dichlorobenzonitrile, 2,6-dibromobenzonitrile and 2,6-diiodobenzonitrile.

2,6-Dichlorobenzonitrile is preferred from the viewpoint of ease in the acquisition of raw materials.

In the process of the invention, 2 equivalents or more of the hydroxyl-containing aromatic amino compound is sufficient for the amount of dihalogenopyridene or dihalogenobenzonitrile.

Preferred range of use is 2~2.5 equivalents in consideration of complex post treatment and cost increase.

The base which can be used in the invention is carbonate, hydrogen carbonate, hydroxide or alkoxide of alkali metals.

Exemplary bases include potassium carbonate, potassium hydrogen carbonate, potassium hydroxide, sodium carbonate, sodium hydroxide, sodium hydrogen carbonate, lithium carbonate, lithium hydroxide, sodium methoxide and potassium isopropoxide. The amount of these bases used is 1 equivalent or more, preferably 1~2 equivalents for the halogen radical in the raw material dihalogenopyridine or dihalogenobenzonitrile Representative solvents which can be used in the process of the invention include N,N-dimethylformamide, N,N-diethylformamide, N,N-dimethylacetamide, N-methylpyrrolidone, 1,3-dimethyl-2-imidazolidinone, dimethyl sulfoxide and sulfolane. No particular limitation is imposed upon the amount of these solvents. Usually, 1~10 times by weight of the solvent is sufficient for the weight of raw materials.

A catalyst for accelerating the reaction can be used in the process of the invention. Exemplary catalysts include copper powder and copper compounds, and phase transfer catalysts such as crown ether, polyethylene glycol, quaternary ammonium base and quaternary phosphonium base.

Reaction temperature is usually in the range of 40~250° C., preferably in the range of 100~200° C.

In a reaction procedure of the invention, a prescribed amount of the hydroxyl-containing aromatic amino compound, base and solvent is charged to a reaction vessel in order to convert the hydroxyl-containing aromatic amino compound into an alkali metal salt, and dihalogenopyridine or dihalogenobenzonitrile is successively added to progress the reaction. In another reaction procedure, the whole materials including dihalogenopyridine or dihalogenobenzonitrile are charged at the same time and heated as intact to promote the reaction. No restriction is imposed upon the reaction procedure and any other procedures can also be suitably carried out.

When water is present in the reaction system, water can be removed out of the reaction system by ventilating nitrogen gas in the course of the reaction. Generally, a procedure for azeotropically removing water out of the reaction system is frequently carried out by using a small amount of benzene, toluene, xylene or chlorobenzene.

End point of the reaction can be determined according to decrease in the amount of the raw material by thin layer chromatography or high performance liquid chromatography.

After finishing the reaction, the reaction mixture is poured after concentration or as intact into water to obtain crude aromatic diamine.

The crude diamine can be purified by recrystallization from or sludging with a solvent, or mineral acid salt formation by an aqueous HCl solution.

Aromatic diamine thus obtained is used as a requisite monomer for preparing polyimide of the invention.

Other aromatic diamine can incorporate in the range giving no adverse effect on the good properties of polyimide.

Aromatic tetracarboxylic dianhydride which can be used in the invention is one or more compounds represented by the formula (4):

wherein Ar is same as above.

In the aromatic tetracarboxylic dianhydride of the formula (4), Ar is monoaromatic radical of the formula (a):

condensed polyaromatic radical of the formula (b):

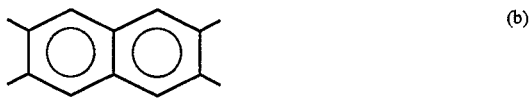

and noncondensed aromatic radical being connected to each other with a direct bond or a bridge member and having the formula (c):

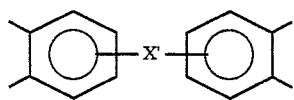

wherein X' is a direct bond, —CO—, —O—, —S—, —SO$_2$—, —CH$_2$—, —C(CH$_3$)$_2$—, —C(CF$_3$)$_2$—,

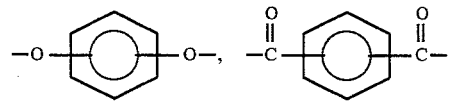

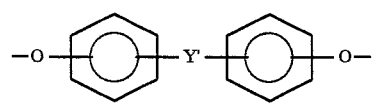

wherein Y' is a direct bond —CO—, —O—, —S—, —SO$_2$—, —CH$_2$—, —C(CH$_3$)$_2$— or —C(CF$_3$)$_2$—.

Exemplary tetracarboxylic dianhydride of the formula (4) which can be used in the invention include, pyromellitic dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride,
2,2-bis(2,3-dicarboxyphenyl)propane dianhydride,
bis(3,4-dicarboxyphenyl)ether dianhydride,
bis(3,4-dicarboxyphenyl)sulfone dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
2,2-bis(3,4-dicarboxyphenyl)-1,1,1,3,3,3-hexafluoropropane dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride, and
1,2,7,8-phenanthrenetetracarboxylic dianhydride.

These dianhydrides can be used singly or as a mixture.

The ratio of aromatic tetracarboxylic dianhydride to aromatic diamine is usually adjusted in the preparation of polyimide in order to control the molecular weight of formed polyimide. In the process of the invention, an appropriate mole ratio of aromatic tetracarboxylic dianhydride to aromatic diamine in order to obtain polyimide of good melt-flowability is in the range of 0.9~1.0.

Polyimide of the invention obtain by using the above aromatic diamine and aromatic tetracarboxylic dianhydride as monomer components has requisite structural units comprising recurring structural units essentially represented by the formula (1).

A polyimide copolymer comprising recurring structural units represented by the above formula (1) and recurring structural units represented by the above formula (2) can be obtained by using as monomers a mixture of aromatic diamine of the invention with one or more other aromatic diamines and one or more aromatic tetracarboxylic dianhydrides.

The polyimide copolymer comprising recurring structural units represented by the formula (1) and recurring structural units represented by the formula (2) can be prepared in the presence of one or more aromatic diamines represented by the formula (9):

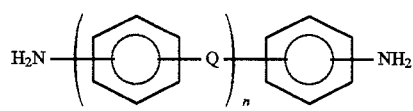

wherein n is an integer of 0~6 and Q is a direct bond, —O—, —S—, —CO—, —SO$_2$—, —CH$_2$—, —C(CH$_3$)$_2$— or —C(CF$_3$)2— and when two or more bonding radicals Q connect aromatic rings to each other, the bonding radicals Q can be the same or different, by reacting aromatic diamine represented by the formula (3):

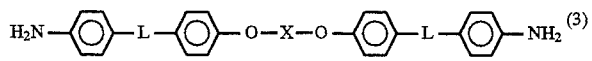

wherein L and X are the same as above, with one or more tetracarboxylic dianhydride represented by the formula (10)

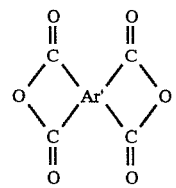

wherein Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

Useful aromatic diamines represented by the formula (9) include, for example, m-phenylenediamine, o-phenylenediamine,
p-phenylenediamine, benzidine, 4,4'-diaminodiphenyl ether,
3,3'-diaminodiphenyl ether, 3,4'-diaminodiphenyl ether,
bis(3-aminophenyl)sulfide, (3-aminophenyl)(4-aminophenyl)sulfide,
bis(4-aminophenyl)sulfide, bis(3-aminophenyl)sulfone,
(3-aminophenyl)(4-aminophenyl)sulfone, bis(4-aminophenyl sulfone,
3,3'-diaminobenzophenone, 3,4'-diaminobenzophenone,
4,4'-diaminobenzophenone, 3,3'-diaminodiphenylmethane,
3,4'-diaminodiphenylmethane, 4,4'-diaminodiphenylmethane,
2,2-bis(4-aminophenyl)propane, 2,2-bis(3-aminophenyl)propane,
2-(3-aminophenyl)-2-(4-aminophenyl)propane,
2,2-bis(4-aminophenyl)-1,1,1,3,3,3-hexafluoropropane,
2,2-bis(3-aminophenyl)-1,1,1,3,3,3-hexafluoropropane,
2-(3-aminophenyl)-2-(4-aminophenyl)-1,1,1,3,3,3-hexafluoropropane,
1,3-bis(3-aminophenoxy)benzene, 1,3-bis(4-aminophenoxy)benzene,
1,4-bis(3-aminophenoxy)benzene, 1,4-bis(4-aminophenoxy)benzene,
1,3-bis(3-aminobenzoyl)benzene, 1,3-bis(4-aminobenzoyl)benzene,
1,4-bis(3-aminobenzoyl)benzene, 1,4-bis(4-aminobenzoyl)benzene,
3,3'-diamino-4-phenoxybenzophenone, 4,4'-diamino-5-phenoxybenzophenone,
3,4'-diamino-4-phenoxybenzophenone, 3,4'-diamino-5'-phenoxybenzophenone,
4,4'-bis(4-aminophenoxy)biphenyl, 3,3'-bis(4-aminophenoxy)biphenyl,
3,4'-bis(3-aminophenoxy)biphenyl, bis[4-(4-aminophenoxy)phenyl]ketone, bis[4-(3-aminophenoxy)phenyl]ketone,
bis[3-(4-aminophenoxy)phenyl]ketone,
bis[3-(3-aminophenoxy)phenyl]ketone,
3,3'-diamino-4,4'-diphenoxybenzophenone,
4,4'-diamino-5,5'-diphenoxybenzophenone,
3,4'-diamino-4,5'-diphenoxybenzophenone,
bis[4-(4-aminophenoxy)phenyl]sulfide,
bis[4-(3-aminophenoxy)phenyl]sulfide,
bis[3-(4-aminophenoxy)phenyl]sulfide,
bis[3-(3-aminophenoxy)phenyl]sulfide,
bis[4-(4-aminophenoxy)phenyl]sulfone,
bis[4-(3-aminophenoxy)phenyl]sulfone,
bis[3-(4-aminophenoxy)phenyl]sulfone,
bis[3-(3-aminophenoxy)phenyl]sulfone,
bis[4-(4-aminophenoxy)phenyl]ether, bis[4-(3-aminophenoxy)phenyl]ether,
bis[3-(4-aminophenoxy)phenyl]ether, bis[3-(3-aminophenoxy)phenyl]ether,
bis[4-(4-aminophenoxy)phenyl]methane,
bis[4-(3-aminophenoxy)phenyl]methane,
bis[3-(4-aminophenoxy)phenyl]methane,
bis[3-(3-aminophenoxy)phenyl]methane,
2,2-bis[4-(3-aminophenoxy)phenyl]propane,
2,2-bis[4-(4-aminophenoxy)phenyl]propane,
2,2-bis[3-(3-aminophenoxy)phenyl]propane,
2,2-bis[3-(4-aminophenoxy)phenyl]propane,
2,2-bis[4-(3-aminophenoxy)phenyl]-1,1,1,3,3,3-hexafluoropropane,
2,2-bis[4-(4-aminophenoxy)phenyl]-1,1,1,3,3,3-hexafluoropropane,
2,2-bis[3-(3-aminophenoxy)phenyl]-1,1,1,3,3,3-hexafluoropropane,
2,2-bis[3-(4-aminophenoxy)phenyl]-1,1,1,3,3,3-hexafluoropropane,
1,4-bis[4-(3-aminophenoxy)benzoyl]benzene,
1,3-bis[4-(3-aminophenoxy)benzoyl]benzene,
1,3-bis(3-amino-4-phenoxybenzoyl)benzene,
1,4-bis(3-amino-4-phenoxybenzoyl)benzene,
1,3-bis(4-amino-5-phenoxybenzoyl)benzene,
1,4-bis(4-amino-5-phenoxybenzoyl)benzene,
4,4'-bis[3-(4-aminophenoxy)benzoyl]diphenyl ether,
4,4'-bis[3-(3-aminophenoxy)benzoyl]diphenyl ether,
4,4'-bis[4-(4-amino-α,α-dimethybenzyl)phenoxy]benzophenone,
4,4'-bis[4-(4-amino-α,α-dimethybenzyl)phenoxy]diphenyl sulfone,
bis[4- {4-(4-aminophenoxy) phenoxy} phenyl]sulfone,
3,3'-diamino-4,4'-dibiphenoxybenzophenone,
4,4'-diamino-5,5'-dibiphenoxybenzophenone,
3,4'-diamino-4,5'-dibiphenoxybenzophenone,
1,3-bis(3-amino-4-biphenoxybenzoyl)benzene,
1,4-bis(3-amino-4-biphenoxybenzoyl)benzene,
1,3-bis(4-amino-5-biphenoxybenzoyl)benzene,
1,4-bis(4-amino-5-biphenoxybenzoyl)benzene,
1,4-bis[4-(4-aminophenoxy)phenoxy-α,α-dimethybenzyl] benzene,
1,3-bis[4-(4-aminophenoxy)phenoxy-α,α-dimethybenzyl] benzene,
1,3-bis[4-(4-amino-6-trifluoromethylphenoxy)-α,α-dimethybenzyl]benzene,
1,3-bis[4-(4-amino-6-fluorophenoxy)-α,α-dimethybenzyl] benzene,
1,3-bis[4-(4-amino-6-methylphenoxy)-α,α-dimethybenzyl] benzene,
1,3-bis[4-(4-amino-6-cyanophenoxy)-α,α-dimethybenzyl] benzene,
1,3-bis(3-amino-4-biphenoxybenzoyl)benzene,
1,4-bis(3-amino-4-biphenoxybenzoyl)benzene,
1,3-bis(4-amino-5-biphenoxybenzoyl)benzene, and
1,4-bis(4-amino-5-biphenoxybenzoyl)benzene, These aromatic diamines can be used singly or as a mixture.

Any compounds enumerated as examples of the above general formula (4) can be used as tetracarboxylic dianhydride represented by the formula (10) which is used for another monomer. Tetracarboxylic dianhydride represented by the formula (10) can be the same as or differ from the tetracarboxylic anhydride represented by the formula (4). Tetracarboxylic dianhydride for use in the preparation of the polyimide copolymer can be used singly or as a mixture.

In the preparation of polyimide or a polyimide copolymer, proportion of the aromatic diamine component and the aromatic tetracarboxylic dianhydride component is 1~0.01 parts by mole of aromatic diamine represented by the formula (3) and 1~0.01 parts by mole of aromatic tetracarboxylic dianhydride represented by the formula (4), and additionally 0~0.99 parts by mole of aromatic diamine represented by the formula (9) and 0~0.99 parts by mole of aromatic tetracarboxylic dianhydride represented by the formula (10). In the case of the polyimide copolymer, proportion of aromatic diamine represented by the formula (3) is preferably 0.5 parts by mole or more, more preferably 0.7 parts by mole or more.

Polyimide and the polyimide copolymer of the invention includes a homopolymer and copolymer having at the polymer chain end an aromatic ring which is unsubstituted or substituted with a radical having no reactivity with amine or dicarboxylic anhydride, and a composition comprising the homopolymer or copolymer. These types of product sometimes exhibit better properties.

Polyimide and the polyimide copolymer having at the polymer chain end an aromatic ring which is unsubstituted or substituted with a radical having no reactivity with amine or dicarboxylic anhydride can be obtained from the homopolymer and copolymer which are derived from aromatic diamine essentially represented by the formula (3) or a mixture thereof with other aromatic diamine and one or more tetracarboxylic dianhydride essentially represented by the formula (4), by capping with aromatic dicarboxylic anhydride represented by the formula (5):

(5)

wherein Z is the same as above, or aromatic monoamine represented by the formula (6):

$Z_1$—$NH_2$ (6)

wherein $Z_1$ is the same as above, preferably with phthalic anhydride or aniline.

This type of polyimide can be prepared by reacting the aromatic diamine component with aromatic tetracarboxylic dianhydride in the presence of aromatic dicarboxylic anhydride represented by the formula (5) or aromatic monoamine represented by the formula (6), and successively by thermally or chemically imidizing the resultant polyamic acid.

Exemplary aromatic dicarboxylic anhydrides represented by the formula (5) include
phthalic anhydride, 2,3-benzophenonedicarboxylic anhydride, 3,4-benzophenonedicarboxylic anhydride,
2,3-dicarboxyphenyl phenyl ether anhydride,
3,4-dicarboxyphenyl phenyl ether anhydride,
2,3-biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
3,4-dicarboxyphenyl phenyl sulfide anhydride,
1,2-naphthalenedicarboxylic anhydride,
2,3-naphthalenedicarboxylic anhydride,
1,8-naphthalenedicarboxylic anhydride,
1,2-anthracenedicarboxylic anhydride,
2,3-anthracenedicarboxylic anhydride, and
1,9-anthracenedicarboxylic anhydride.

These dicarboxylic anhydrides can be substituted with a radical having no reactivity for amine and dicarboxylic anhydride.

Phthalic anhydride is most preferred in these dicarboxylic anhydrides from the standpoint of properties and practical use of resulting polyimide. That is, resulting polyimide has excellent stability in high temperature processing and is very useful, for example, for structural materials, space and aeronautic equipment, electric and electronic appliances, adhesives in view of high heat resistance and excellent processability.

When phthalic anhydride is used, no restriction is put upon the replacement of a portion of phthalic anhydride by other dicarboxylic anhydride in the range giving no adverse effect on the good properties of polyimide.

Amount of dicarboxylic anhydride is in the range of 0.001–1.0 mol per mol of aromatic diamine. Use of less than 0.001 mol lead to viscosity increase in high temperature processing and causes reduction of processability.

On the other hand, the amount exceeding 1.0 mol leads to decrease in mechanical properties. Thus, preferred range of use is 0.01–0.5 mol.

Aromatic monoamines which can be used include, for example,
aniline, o-toluidine, m-toluidine, p-toluidine, 2,3-xylidine, 2,6-xylidine, 3,4-xylidine, 3,5-xylidine, o-chloroaniline,
m-chloroaniline, p-chloroaniline, o-bromoaniline, m-bromoaniline,
p-bromoaniline, o-nitroaniline, m-nitroaniline, p-nitroaniline,
o-aminophenol, m-aminophenol, p-aminophenol, o-anisidine, m-anisidine,
p-anisidine, o-phenetidine, m-phenetidine, p-phenetidine,
o-aminobenzaldehyde, m-aminobenzaldehyde, p-aminobenzaldehyde,
o-aminobenzonitrile, m-aminobenzonitrile, p-aminobenzonitrile,
2-aminobiphenyl, 3-aminobiphenyl, 4-aminobiphenyl,
2-aminophenyl phenyl ether, 3-aminophenyl phenyl ether,
4-aminophenyl phenyl ether, 2-aminobenzophenone, 3-aminobenzophenone,
4-aminobenzophenone, 2-aminophenyl phenyl sulfide,
3-aminophenyl phenyl sulfide, 4-aminophenyl phenyl sulfide,
2-aminophenyl phenyl sulfone, 3-aminophenyl phenyl sulfone,
4-aminophenyl phenyl sulfone, α-naphthylamine, β-naphthylamine,
1-amino-2-naphthol, 2-amino-1-naphthol, 4-amino-1-naphthol,
5-amino-1-naphthol, 5-amino-2-naphthol, 7-amino-2-naphthol,
8-amino-1-naphthol, 8-amino-2-naphthol, 1-aminoanthracene,
2-aminoanthracene and 9-aminoanthracene. These aromatic monoamines can be substituted with a radical having no reacting for amine and dicarboxylic anhydride.

These aromatic monoamines can be substituted with a radical having no reactivity with amine and dicarboxylic anhydride.

Amount of aromatic monoamine is 0.001–1.0 mol per mol of tetracarboxylic dianhydride. The amount less than 0.001 mol ratio leads to viscosity increase in high temperature processing and reduction of processability. On the other hand, the amount exceeding 1.0 mol ratio results in reduction of mechanical properties. Thus, preferred amount is in the range of 0.01–0.5 mol ratio.

A suitable mol ratio of aromatic tetracarboxylic dianhydride to aromatic diamine in order to obtain polyimide having good melt flowability as above is in the range of 0.9=18 1.0. Consequently, in the case of preparing polyimide having an unsubstituted or substituted aromatic ring at the polymer chain end thereof, proportion of aromatic tetracarboxylic dianhydride, aromatic diamine and dicarboxylic anhydride or aromatic monomer is 0.9–1.0 mol of aromatic diamine and 0.001–1.0 mol of dicarboxylic anhydride or aromatic monoamine per mol of tetracarboxylic dianhydride.

Any preparation process of polyimide including known processes can be applied to prepare polyimide of the invention. A process for carrying out the reaction in an organic solvent is particularly preferred.

A preferred solvent for such reaction is N,N-dimethylacetamide.

Other useful solvents include, for example,
N,N-dimethylformamide, N,N-diethylacetamide,
N,N-dimethylmethoxyacetamide, N-methyl-2-pyrrolidone,
1,3-dimethyl-2-imidazolidinone, N-methylcaprolactam,
1,2-dimethoxyethane, bis(2-methoxyethyl)ether,
1,2-bis(2-methoxyethoxy)ethane, bis[2-(2-methoxyethoxy)ethyl]ether,
tetrahydrofuran, 1,3-dioxane, 1,4-dioxane, pyridine, picoline,
dimethyl sulfoxide, dimethyl sulfone, tetramethylurea,
hexamethylphosphoramide, phenol, o-cresol, m-cresol, p-cresol,
m-cresylic acid, p-chlorophenol, anisole, benzene, toluene and xylenes.

These organic solvents can be used singly or as a mixture.

In the process of the invention, the reaction is carried out by the addition of aromatic diamine, aromatic tetracarboxylic dianhydride and aromatic dicarboxylic anhydride or aromatic monoamine to the organic solvent according to the following procedures.

(A) After reacting aromatic tetracarboxylic dianhydride with aromatic diamine, aromatic dicarboxylic anhydride or aromatic monoamine is added to continue the reaction.

(B) After reacting aromatic diamine with aromatic dicarboxylic anhydride, aromatic tetracarboxylic dianhydride is added to continue the reaction.

(C) After reacting aromatic tetracarboxylic dianhydride with aromatic monoamine, aromatic diamine is added to continue the reaction.

(D) Aromatic tetracarboxlic dianhydride, aromatic diamine and aromatic dicarboxylic anhydride or aromatic monoamine are added at one time and the reaction is carried out. Any of the above addition procedures can be conducted.

Reaction temperature is usually 250° C. or less, preferably 50° C. or less. No particular limitation is imposed upon the reaction pressure. Atmospheric pressure is satisfactory for carrying out the reaction. Reaction time differs depending upon the tetracarboxylic dianhydride, solvent and reaction temperature and sufficient time for carrying out the reaction is usually 4 to 24 hours.

Further, polyamic acid thus obtained is thermally imidized by heating at 100° C. to 400° C. or chemically imidized by using an imidizing agent such as acetic anhydride to give polyimide having recurring structural units corresponding to those of polyamic acid.

The desired polyimide can also be prepared by suspending or dissolving in an organic solvent aromatic diamine and aromatic tetracarboxylic dianhydride, and additionally aromatic dicarboxylic anhydride or aromatic monoamine in the case of terminating the polyimide with an aromatic ring, and successively heating the mixture to carry out formation and imidization of the polyimide precursor polyamic acid at the same time.

The solution obtained by dissolving the polyamic acid precursor of polyimide of the invention in N,N-dimethylacetamide in a concentration of 0.5 g/dl has an inherent viscosity of 0.01~3.0 dl/g at 35° C. The solution obtained by heat-dissolving the polyimide powder of the invention in a solvent mixture of P-chlorophenol/phenol (9/1 by weight) in a concentration of 0.5 g/dr has an inherent viscosity of 0.01~3.0 dl/g at 35° C.

The polyimide film of the invention can be prepared by casting on a glass plate a varnish of polyamic acid precursor of the polyimide and heating to carry out imidization, by hot-pressing the polyimide powder as intact to form a film or by removing an organic solvent upon heating from the solution dissolved the polyimide to form a film. That is, films and powder of polyimide can be prepared by conventionally known methods.

The polyimide based resin composition of the invention comprises 100 parts by weight of the polyimide or polyimide copolymer of the invention and 5~70 parts by weight, preferably 10~50 parts by weight of fibrous reinforcements such as carbon fiber, glass fiber, aromatic polyamide fiber and potassium titanate fiber. When the amount of the fibrous reinforcements is less than 5 parts by weight, sufficient reinforcing effect cannot be obtained. On the other hand, the amount exceeding 70 parts by weight makes difficult to obtain good molded articles by injection molding or other melt processing methods.

The polyimide based resin composition of the invention can be prepared by a conventionally known process.

Addition of the reinforcements to the polyimide resin can be carried out by usually known methods. For example, in the most common method, polyimide powder and reinforcements are premixed with a mortar, Henschel mixer, drum blender, ball mill and ribbon blender and successively kneaded with a melt mixer or hot rolls to obtain pellets or powdery mixture.

The polyimide resin composition of the invention can be practically applied to melt-processing such as injection molding, extrusion forming, compression molding, rotary molding and other various known processing methods. Polyimide used in the invention has excellent melt flowability in particular, and thus the polyimide resin composition of the invention can be most preferably applied to injection molding process in view of operation efficiency.

In the case of melt-processing the polyimide of the invention, other thermoplastic resin can be blended in a suitable amount depending upon the object for use as long as giving no adverse effect on the good properties of polyimide.

Thermoplastic resins which can be blended include, for example, polyethylene, polypropylene, polycarbonate, polyarylate, polyamide, polysulfone, polyether sulfone, polyether ketone, polyether ether ketone, polyphenylene sulfide, polyamideimide, polyetherimide, modified polyphenyleneoxide, polyimide and other kinds of polyimides.

Solid lubricants such as molybdenum disulfide, graphite, boron nitride, lead monoxide and lead powder can also be added singly or as a mixture.

Fillers which are used for common resin compositions can be added in the range not impairing the object of the invention. Exemplary fillers include graphite, carborundum, silica powder, molybdenum disulfide, fluoro resin and other wear resistance improvers; antimony trioxide, magnesium carbonate, calcium carbonate and other retardance improvers; clay, mica and other electrical property improvers; asbestos, silica, graphite and other tracking resistance improvers; barium sulfide, silica, calcium metasilicate and other acid resistance improvers; iron powder, zinc powder, copper powder and other thermal conductivity improvers; and other miscellaneous materials such as glass beads, glass balloons, talc, diatomaceous earth, alumina, silicate balloons, hydrated alumina, metal oxide and colorants.

The invention will hereinafter be illustrated in detail by way of examples. Properties of polyimide in the examples were measured by the following methods.

Inherent viscosity : Polyamic acid was dissolved in N,N-dimethylacetamide and polyimide was dissolved in a solvent mixture of p-chlorophenol/phenol (9/1 weight ratio), respectively in a concentration of 0.5 g/100 ml, and measured at 35° C.

Tg : Measured by DSC with a DSC-41M (Shimadzu DT-40 Series).

5% Weight loss temperature : Measured by DTG in the air with a DTG-40M (Shimadzu DT-40 Series).

Flow initiation temperature : Measured with a Shimadzu Koka Type Flow Tester CFT-500A under load of 100 kg at a temperature increases rate of 5° C./min.

Melt viscosity : Measured with a Shimadzu Koka Type Flow Tester CFT-500A under load of 100 kg.

Tensile strength : Measured in accordance with ASTM-D-638

Elongation : Measured in accordance with ASTM-D-638

Tensile modulus : Measured in accordance with ASTM-D-638

Flexural strength : Measured in accordance with ASTM-D-790

Flexural Modulus : Measured in accordance with ASTM-D-790

Notched Izod impact strength : Measured in accordance with ASTM-F-256

Heat distortion temperature : Measured in accordance with ASTM-D-648

Molding shrinkage : Measured in accordance with ASTM-D-955.

EXAMPLE 1

To a four necked flask equipped with a thermometer, reflux condenser and stirrer, 250 g of 1,3-dimethyl-2-imidazolidinone (DMI), 20 g (0.116 mol) of 2,6-dichlorobenzonitrile, 55.5 g (0.244 mol) of 2-(4-aminophenyl)-2-(4'-hydroxyphenyl)propane and 20 g (0.145 mol) of potassium carbonate were charged. The mixture was heated to 140° C. with stirring and aged at 140° C. for 14 hours.

After finishing the reaction, the reaction mixture was cooled to 90° C. and filtered to remove inorganic salts.

The filtrate was mixed with 150 g of water, cooled to room temperature and separated an organic layer. The organic layer thus obtained was dissolved in 100 g of isopropyl alcohol (IPA) and mixed with 200 g of 36% HCl to precipitate hydrochloride. Hydrochloride was recrystallized from a mixture of 150 g of water and 45 g of IPA to obtain 2,6-bis[4-(4-amino-α,α-dimethylbenzyl)phenoxy]benzonitrile hydrochloride (p-COBN-M.2HCl). p-COBN-M. 2HCl was dissolved in a mixture of 90 g of water and 90 g of IPA and precipitated by adding 30 g of an 28% aqueous ammonia solution. The precipitated crystal was filtered and dried to obtain 40 g of desired 2,6-bis[4-(4-amino-α,α-dimethylbenzyl)phenoxy]benzonitrile hydrochloride(p-COBN-M). The yield was 62%. Melting point was 194.1°~194.8° C.

| 1H-NMR δ (DMSO-d6, ppm) | | |
|---|---|---|
| 1.59 | (S, 12H) | ① |
| 4.87 | (S, 4H) | ② |
| 6.44~6.59 | (m, 6H) | ③ ④ |
| 6.86~7.50 | (m, 13H) | ⑤ ⑥ ⑦ ⑧ |

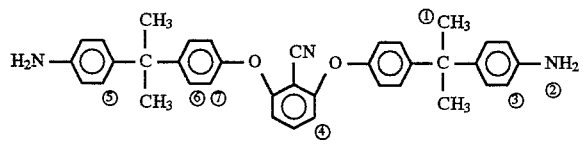

EXAMPLE 2

To a four necked flask equipped with a thermometer, reflux condenser and stirrer, 550 g of 1,3-dimethyl-2-imidazolidinone (DMI), 56.1 g (0.3 mol) of 2,6-dichlorobenzonitrile, 126.8 g (0.63 mol) of 4-(4-aminophenoxy)phenol and 53.9 g (0.39 mol) of potassium carbonate were charged. The mixture was heated to 150° C. with stirring and aged at 150° C. for 6 hours.

After finishing the reaction, the reaction mixture was cooled to 90° C. and filtered to remove inorganic salts. The filtrate was mixed with 120 g of water and crystallized by cooling to room temperature. The precipitated crystal was filtered and recrystallized from an aqueous DMF solution to obtain 120 g of desired 2,6-bis[4-(4-aminophenoxy)phenyloxy]benzonitrile (p-PPBN-M). The yield was 68%. Melting point was 233.3°~234.2° C.

| 1H-NMR δ (DMSO-d6, ppm) | | |
|---|---|---|
| 4.96 | (S, 4H) | ① |
| 6.44~6.57 | (m, 4H) | ② |
| 6.62~7.15 | (m, 8H) | ③ ④ ⑤ |
| 7.19~7.28 | (m, 2H) | ⑥ |
| 7.31~7.57 | (m, 1H) | ⑦ |

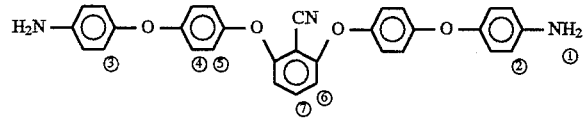

EXAMPLE 3

To a four necked flask equipped with a thermometer, reflux condenser and stirrer, 450 g of N,N-dimethylformamide (DMF), 37 g (0.25 mol) of 2,6-dichloropyridine, 119.3 g (0.525 mol) of 2-(4-aminophenyl)-2-(4'-hydroxyphenyl)propane and 44.9 g (0.325 mol) of potassium carbonate were charged. The mixture was heated to 150° C. with stirring and aged at 150° C. for 28 hours.

After finishing the reaction, the reaction mixture was cooled 90° C. and filtered to remove inorganic salts. The filtrate was mixed with 400 g of water, cooled to room temperature and separated an organic layer. The organic layer obtained was dissolved in 250 g of isopropyl alcohol (IPA) and mixed with 200 g of 36% HCl to precipitate hydrochloride. The hydrochloride was recrystallized from a mixture of 150 g of water and 45 g of IPA to obtain 2,6-bis[4-(4-amino-α,α-dimethylbenzyl)phenoxy]pyridine hydrochloride (p-COP-M .2HCl).

p-COP-M . 2HCl was dissolved in a mixture of 90 g of water and 90 g of IPA and precipitated by neutralizing with 90 g of a 28% aqueous NH₄OH solution. The precipitated crystal was filtered and dried to obtain 83 g of desired p-COP-M. The yield was 63%. Melting point was 123.3~124.7° C.

| Results of elemental analysis. | | | |
|---|---|---|---|
| | C | H | N |
| Calculated (%) | 79.37 | 6.66 | 7.93 |
| Found (%) | 79.50 | 6.63 | 7.89 |

EXAMPLE 4

To a reaction vessel equipped with a stirrer, reflux condenser and nitrogen inlet tube, 27.69 g (0.05 mol) of 2,6-bis[4-(4-amino-α,α-dimethylbenzyl)phenoxy]benzonitrile, 10.47 g (0.048 mol) of pyromellitic dianhydride, 0.592 g (0.004 mol) of phthalic anhydride, 70 g of γ-picoline and 152.6 g of m-cresol were charged. The mixture was heated to 150° C. with stirring in a nitrogen atmosphere. The reaction was successively carried out at 150° C. for 4 hours while distilling out 1.8 ml of water.

After finishing the reaction, the reaction mixture was cooled to room temperature and poured into 1 liter of methyl ethyl ketone.

Precipitated polyimide was filtered, washed with methyl ethyl ketone and dried at 50° C. for 24 hours in the air and at 220° C. for 4 hours in a nitrogen atmosphere to give 34.66 g (93.8% yield) of polyimide powder. The polyimide powder obtained had an inherent viscosity of 0.61 dl/g, glass transition temperature of 264° C. and 5% weight loss temperature of 504° C.

An infrared absorption spectrum of the polyimide powder is shown in FIG. 1. The spectrum exhibits remarkable absorption around 1780 cm⁻¹ and 1720 cm⁻¹ which are characteristic absorption bands of imide.

Results of elemental analysis on the polyimide powder obtained are as follows.

| | C | H | N |
|---|---|---|---|
| Calculated (%) | 76.71 | 4.53 | 5.71 |
| Found (%) | 77.54 | 4.63 | 5.42 |

The flow initiation temperature of the polyimide powder measured with a Koka type flow tester was 345° C. Further, molding stability of the polyimide powder was measured by changing a residence time in the cylinder of the flow tester.

Figure 2:
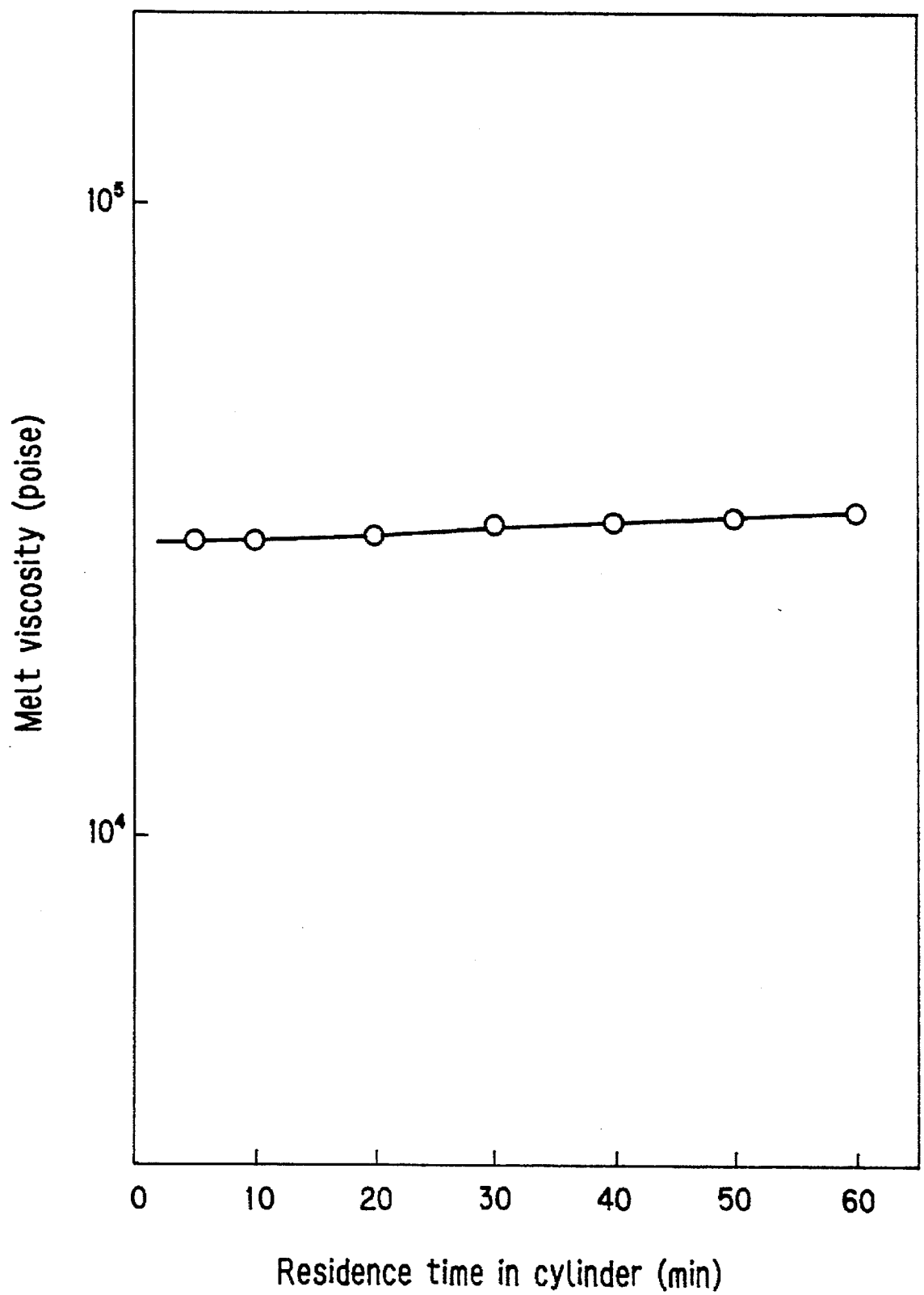
FIG. 2 is results measured on the effect of residence time in the cylinder of a flow tester on the melt viscosity variation of the polyimide powder obtained in Example 4.

Results obtained at 380° C. under load of 100 kg are illustrated in FIG. 2. Melt viscosity was almost stable even though the residence time in the cylinder was extended and proved to have good molding stability. The strand obtained in the measurement had high flexibility.

EXAMPLES 5-9

Polyimide powder was prepared by carrying out the same procedures as described in Example 4 except that diamine components and acid anhydride components were used as illustrated in Table 1. Table 1 illustrates diamine components, acid anhydride components, yields and fundamental properties such as inherent viscosity and Tg, together with results of Example 4.

EXAMPLE 10

To a flask equipped with a stirrer, reflex condenser and nitrogen inlet tube, 27.69 g (0.05 mol) of 2,6-bis[4-(4-amino-α,α-dimethylbenzyl)phenoxy]benzonitrile and 154.4 g of N,N-dimethylacetamide were charged and 10.91 g (0.05 mol) of pyromellitic dianhydride was added by portions in a nitrogen atmosphere with caution to prevent temperature rise of the solution and the resulting mixture was stirred for 30 hours in room temperature. Polyamic acid thus obtained had an inherent viscosity of 0.88 dl/g. A portion of the polyamic acid solution was cast on a glass plate and successively heated at 100°, 200° and 300° C. each for an hour to obtain a polyimide film.

The polyimide film thus obtained had Tg of 278° C., tensile strength of 10.28 kg/mm$^2$, elongation of 9.7% and tensile modulus of 298 kg/cm$^2$.

EXAMPLES 11 AND 12

Polyimide films were prepared by carrying out the same procedures as described in Example 10 except that diamine components and acid anhydride components were used as illustrated in Table 2. Table 2 illustrates diamine components, acid anhydride components, inherent viscosity of polyamic acid, Tg and mechanical properties, together with results of Example 10.

TABLE 1

|  | Diamine | Acid anhydride | η inh (dl/g) | Tg (°C.) | 5% Weight loss temperature (°C.) | Flow initiation temperature (°C.) | Melt viscosity (poise) |
| --- | --- | --- | --- | --- | --- | --- | --- |
| Example 4 | p-COBN-M *1 27.69 g (0.05 mol) | PMDA *2 10.47 g (0.048 mol) | 0.61 | 263 | 504 | 345 | 29300 (400° C./5 min) |
| Example 5 | ↑ | BPDA *3 14.12 g (↑) | 0.56 | 233 | 499 | 295 | 32400 (380° C./5 min) |
| Example 6 | ↑ | BTDA *4 15.47 g (↑) | 0.64 | 225 | 495 | 290 | 19000 (380° C./5 min) |
| Example 7 | p-PPBN-M *5 25.08 g (↑) | ODPA *6 14.89 g (↑) | 0.94 | 211 | 520 | 375 | 32000 (400° C./5 min) |
| Example 8 | ↑ | BPDA 14.12 g (↑) | 1.03 | 224 | 547 | 390 | 84600 (400° C./5 min) |
| Example 9 | ↑ | BTDA 15.47 g (↑) | 0.90 | 220 | 539 | 390 | 33700 (400° C./min) |

*1 2,6-Bis[4-(4-amino-α,α-dimethylbenzyl)phenoxy]benzonitrile
*2 Pyromellitic dianhydride
*3 3,3',4,4'-Tetracarboxybiphenyl dianhydride
*4 3,3'4,4'-Benzophenonetetracarboxylic dianhydride
*5 2,6-Bis[4-(4-aminophenoxy)phenoxy]benzonitrile
*6 3,3',4,4'-diphenylethertetracarboxylic dianhydride

TABLE 2

|  |  |  |  |  | Mechanical property | | |
| --- | --- | --- | --- | --- | --- | --- | --- |
|  | Diamine | Acid anhydride | η inh (dl/g) | Tg (°C.) | Tensile strength (kg/mm$^2$) | Elongation (%) | Tensile modulas (kg/cm$^2$) |
| Example 10 | p-COBN-M 27.69 g (0.05 mol) | PMDA 10.91 g (0.048 mol) | 0.88 | 278 | 10.28 | 9.7 | 298 |
| Example 11 | ↑ | 6FDA *7 22.21 g (0.05 mol) | 1.04 | 244 | 12.83 | 5.7 | 355 |
| Example 12 | p-PPBN-M 25.08 g (↑) | PMDA 10.91 g (0.05 mol) | 0.93 | 270 | 14.37 | 74.0 | 323 |

*7 2,2-bis(3,4-dicarboxyphenyl)-1,1,1,3,3,3-hexafluoropropane dianhydride

EXAMPLE 13

To a reaction vessel equipped with a stirrer, reflux condenser and nitrogen inlet tube, 26.49 g (0.05 mol) of 2,6-bis[4-(4-amino-α,α-dimethylbenzyl)phenoxy]pyridine, 10.47 g (0.048 mol) of pyromellitic dianhydride, 0.592 g (0.004 mol) of phthalic anhydride, 0.70 g of γ-picoline and 147.84g of m-cresol were charged. The mixture was heated to 150° C. with stirring in a nitrogen atmosphere and successively reacted at 150° C. for 4 hours while distilling out 1.8 ml of water.

After finishing the reaction, the reaction mixture was cooled to room temperature and poured into i liter of methyl ethyl ketone. Precipitated polyimide was filtered washed with methyl ethyl ketone and dried at 50° C. for 24 hours in the air and at 220° C. for 4 hours in a nitrogen atmosphere to obtain 34.23 g (95.7% yield) of polyimide powder. Polyimide powder thus obtained had an inherent viscosity 0.57 dl/g, glass transition temperature of 213° C. and 5% weight loss temperature of 492° C.

Figure 3:
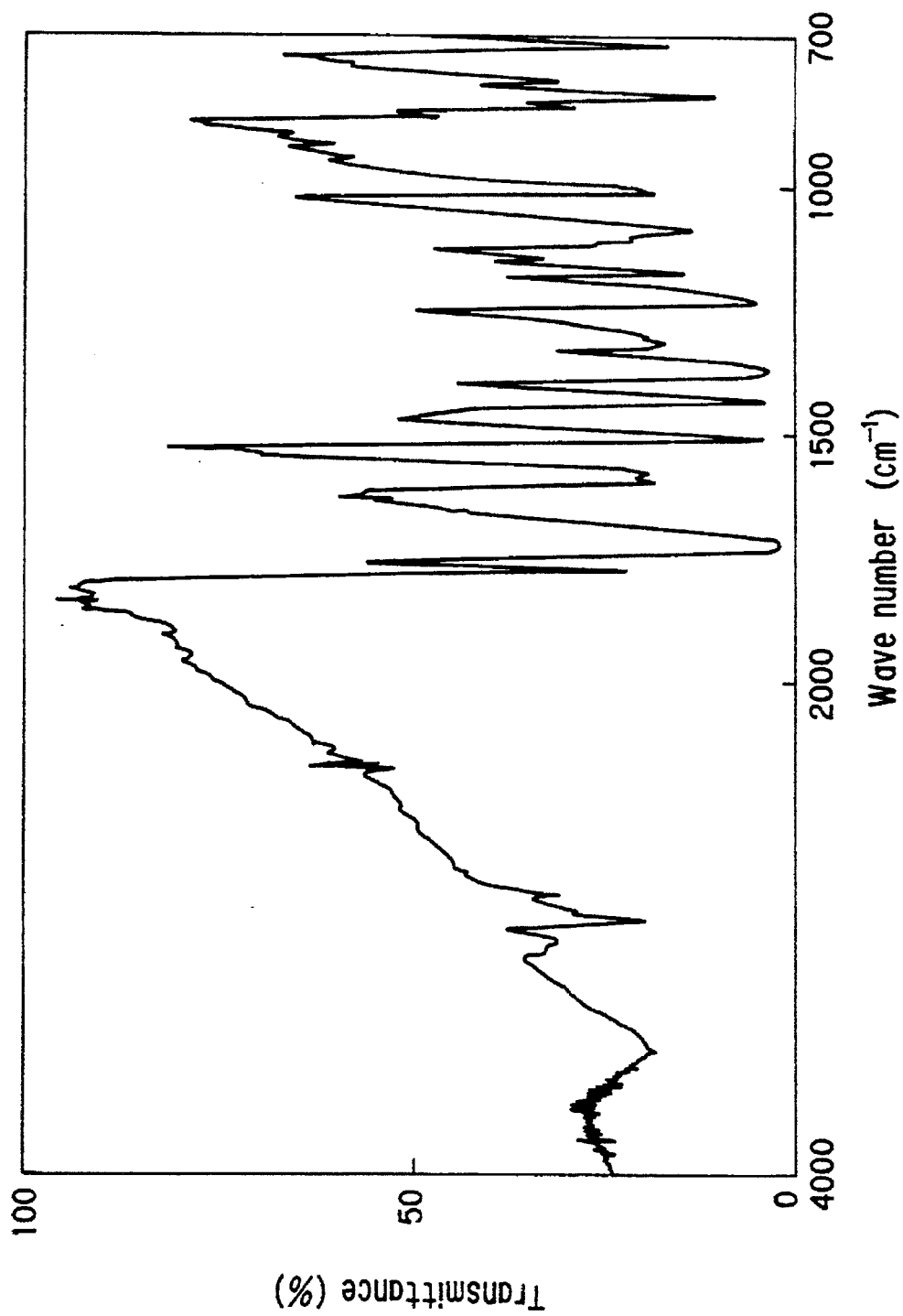
FIG. 3 is an infrared absorption spectrum atlas of the polyimide powder obtained in Example 13.

Infrared absorption spectrum of the polyimide powder is illustrated in FIG. 3. The spectrum exhibits remarkable absorption around 1780 $cm^{-1}$ and 1720 $cm^{-1}$ which are characteristic absorption bonds of imide. Elemental analysis of the polyimide powder were as follows.

|  | C | H | N |
|---|---|---|---|
| Calculated (%) | 75.93 | 4.68 | 5.90 |
| Found (%) | 75.10 | 4.55 | 6.01 |

Melt initiation temperature of the polyimide powder measured with a Koka type flow tester was 390° C. The polyimide powder exhibited a melt viscosity of 350 poise at 400° C. after residence time of 5 minutes and proved to have a very excellent melt flowability.

EXAMPLE 14

Polyimide powder was prepared by carrying out the same procedures as described in Example 13 except that 10.47 g (0.048 mol) of pyromellitic dianhydride was replaced by 15.47 g (0.048 mol) of benzophenonetetracar boxylic dianhydride. Properties of the polyimide powder obtained are illustrated in Table 3 together with results of Example 13.

Figure 4:
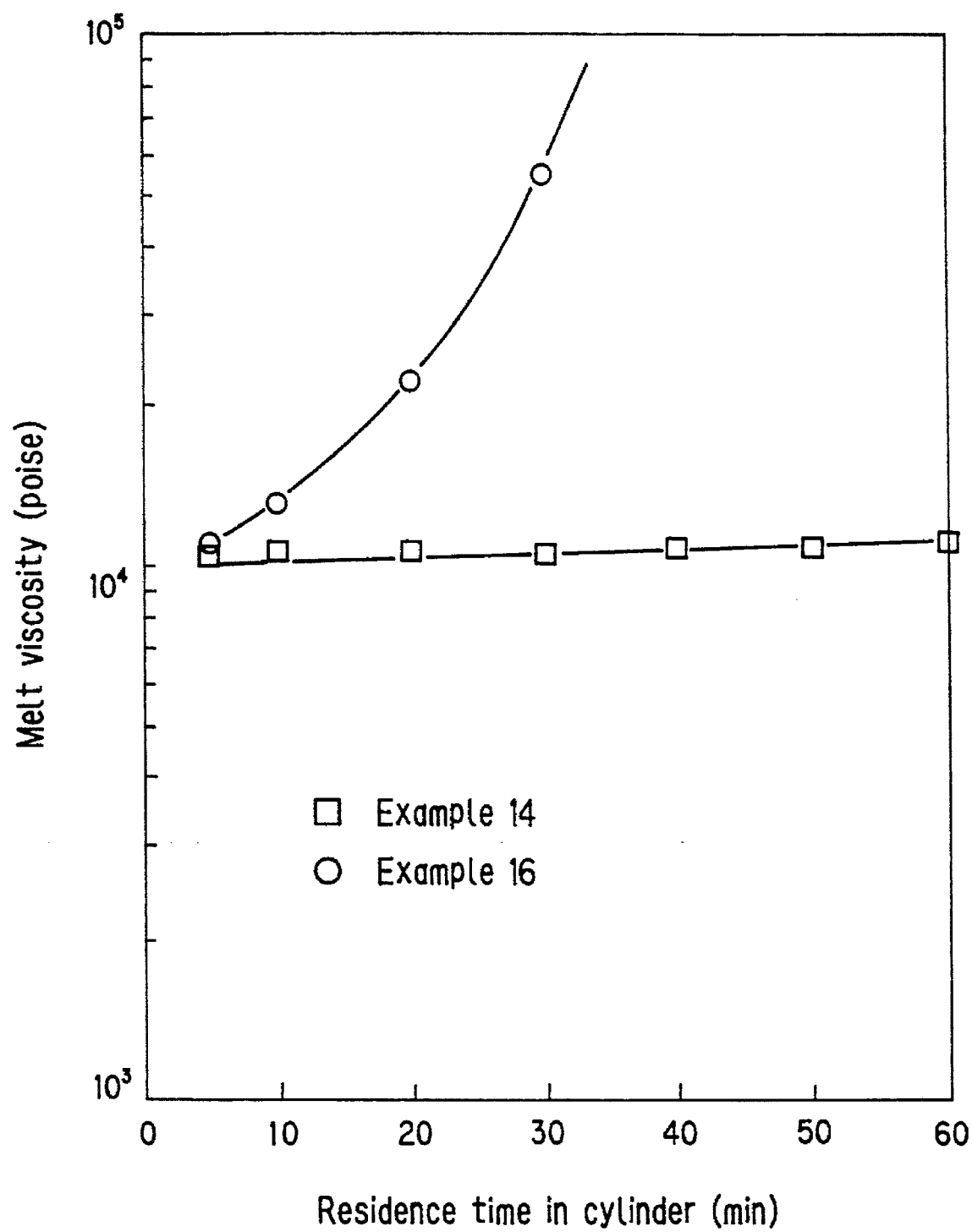
FIG. 4 is results measured on the effect of residence time in the cylinder of a flow tester on the melt viscosity variation of the polyimide powder obtained in Examples 14 and 16.

The polyimide powder had a melt viscosity of 10300 poise at 320° C. and the strand obtained had high flexibility. Further, molding stability of the polyimide powder at high temperature was measured by changing a residence time in the cylinder of the flow tester. Results at 320° C. under load of 100 kg are illustrated in FIG. 4. Melt viscosity was proved to be almost stable even though a residence time in the cylinder was extended.

EXAMPLE 15

Polyimide powder was prepared by carrying out the same procedures as described in Example 13 except that 10.47 g (0.048 mol) of pyromellitic dianhydride was replaced by 14.12 g (0.048 mol) of biphenyltetracarboxylic dianhydride. Properties of the polyimide powder obtained are illustrated in Table 3, together with results of Example 13 and 14.

EXAMPLE 16

Polyimide powder was prepared by carrying out the same procedures as described in Example 14 except that phthalic anhydride was omitted. Molding stability at high temperature of the polyimide powder obtained was measured by changing the residence time in the cylinder of the flow tester as conducted in Example 14. As illustrated in FIG. 4, the melt viscosity increases with extension of residence time in the cylinder.

EXAMPLE 17

To flask equipped with a stirrer, reflux condenser and nitrogen inlet tube, 26.49 g (0.05 mol) of 2,6-bis[4-(4-amino-α,α-dimethylbenzyl)phenoxy]pyridine and 170.4 g of N,N-dimethylacetamide were charged and 16.11 g (0.05 mol) of 3,3',4,4'-benzophenonetetracarboxylic dianhydride was added by portions in a nitrogen atmosphere with caution to prevent temperature rise of the solution and successively stirred for 30 hours at room temperature. Polyamic acid thus obtained had an inherent viscosity of 1.81 dl/g. A portion of the polyamic acid solution was cast on a glass plate and heated 100°, 200° and 300° C. each for an hour to obtain a polyimide film.

The polyimide film had Tg of 214° C., tensile strength of 10.17 $kg/mm^2$, elongation of 4.6% and tensile modulus of 319 $kg/cm^2$.

EXAMPLE 18

A polyimide film was prepared by carrying out the same procedures as described in Example 17 except that 16.11 g (0.05 mol) of 3,3',4,4'-benzophenonetetracarboxylic dianhydride was replaced by 14.71 g (0.05 mol) of 3,3',4,4'-biphenyltetracarboxylic dianhydride. Table 4 illustrates acid anhydride components, inherent viscosity of polyamic acid, Tg and mechanical properties, together, with results of Example 17.

TABLE 3

|  | Diamine | Acid anhydride | η inh (dl/g) | Tg (°C.) | 5% Weight loss temperature (°C.) | Flow initiation temperature (°C.) | Melt viscosity (poise) |
|---|---|---|---|---|---|---|---|
| Example 13 | p-COP-M *1 26.49 g (0.05 mol) | PMDA *2 10.47 g (0.048 mol) | 0.57 | 213 | 492 | 390 | 350 (400° C./5 min) |
| Example 14 | ↑ | BTDA *3 15.47 g (↑) | 0.61 | 206 | 481 | 265 | 10300 (320° C./5 min) |

TABLE 3-continued

| | Diamine | Acid anhydride | η inh (dl/g) | Tg (°C.) | 5% Weight loss temperature (°C.) | Flow initiation temperature (°C.) | Melt & viscosity (poise) |
|---|---|---|---|---|---|---|---|
| Example 15 | ↑ | BPDA *4 14.12 g (↑) | 0.65 | 209 | 488 | 265 | 7360 (330° C./5 min) |

*1 2,6-Bis[4-(4-amino-α,α-dimethylbenzyl)phenoxy]pyridine
*2 Pyromellitic dianhydride
*3 3,3',4,4'-Benzophenonetetracarboxylic dianhydride
*4 3,3',4,4'-Tetracarboxylbiphenyl dianhydride

TABLE 4

| | | | | | Mechanical property | | |
|---|---|---|---|---|---|---|---|
| | Diamine | Acid anhydride | η inh (dl/g) | Tg (°C.) | Tensile strength (kg/mm$^2$) | Elongation (%) | Tensile modulas (kg/cm$^2$) |
| Example 17 | p-COP-M 26.49 g (0.05 mol) | PTDA 16.11 g (0.05 mol) | 1.81 | 214 | 10.17 | 4.6 | 319 |
| example 18 | ↑ | BPDA 14.71 g (0.05 mol) | 1.55 | 220 | 11.43 | 6.2 | 335 |

EXAMPLE 19

To a reaction vessel equipped with a stirrer, reflux condenser and nitrogen inlet tube, 18.54 g (0.035 mol) of 2,6-bis[4-(4-amino-α,α-dimethylbenzyl)phenoxy]pyridine, 3.00 g (0.015 mol) of 4,4'-diaminodiphenyl ether, 10.47 g (0.048 mol) of pyromellitic dianhydride, 0.592 g (0.004 mol) of phthalic anhydride, 0.70 g of γ-picoline and 128.04 g of m-cresol were charged. The mixture was heated to 150° C. with stirring in a nitrogen atmosphere and successively reacted at 150° C. for 4 hours while distilling out 1.8 ml of water.

After finishing the reaction, the reaction mixture was cooled to room temperature and poured into 1 liter of methyl ethyl ketone. Precipitated polyimide was filtered, washed with methyl ethyl ketone and dried at 50° C. for 34 hours in the air and at 220° C. for 4 hours in a nitrogen atmosphere to obtain 29.11 g (94.5% yield) of polyimide powder.

The polyimide powder thus obtained had an inherent viscosity of 0.55 dl/g, Tg of 210° C. and 5% weight loss temperature of 503° C.

Flow initiation temperature and melt viscosity of the polyimide powder were measured by the same method as above. Results are illustrated in Table 5.

EXAMPLES 20~33

Polyimide powder was prepared by carrying out the same procedures as described in Example 19 except that diamine components and acid anhydride components were used as illustrated in Table 5. Table 5 illustrates diamine components, acid anhydride components, inherent viscosity, Tg, 5% weight loss temperature, flow initiation temperature and melt viscosity together with results of Example 19.

EXAMPLES 34~44

A silane-treated glass fiber CS3PE-467S (Trade Mark of Nitto Boseki Co.) having a length of 3 mm and a size of 13 μm was added in an amount illustrated in Table 6 to individually 100 parts by weight of the polyimide powder obtained in the above examples. The mixture was thoroughly mixed with a drum blender (manufactured by Kawata Seisakusho), melt-kneaded at 360~440° C. with a single screw extruder having a bore diameter of 30 mm and delivered in the form of a strand. The strand was cooled in the air and cut into pellets.

Various test specimens were prepared by injection molding the pellets thus obtained at the injection pressure of 500 kg/cm$^2$, cylinder temperature of 360°~420° C. and melt temperature of 160~180° C. with an Ahlburg All Round Injection Molding Machine A 120 (Trade Mark of Ahlburg Co. in Germany). Various physical properties were measured by using these specimens.

Table 6 illustrates results of measurements on tensile strength in accordance with ASTM-D-638, flexural strength and modulus (ASTM-D-790), notched Izod impact strength (ASTM-D-256), heat distortion temperature (ASTM-D-648) and molding shrinkage (ASTM-D-955).

COMPARATIVE EXAMPLES 1~11

Test specimens were prepared by carrying out the same procedures as described in Examples 34~44 except that the silane-treated glass fiber was used in an amount outside the scope of the invention. The same properties as Examples 34~44 were measured by using these specimens and results are illustrated in Table 6.

EXAMPLES 45~55

A carbon fiber TORECA (Trade Mark of Torey Co.) having a length of 3 mm, average size of 12 μm and aspect ratio of 250 was added in an amount illustrated in Table 7 to individually 100 parts by weight of the polyimide powder obtained in the above examples. The mixture was throughly mixed with a drum blender melt-kneaded at 360~440° C. with a single screw extruder having a bore diameter of 30 mm and delivered in the form of a strand. The strand was cooled in the air and cut into pellets.

Various test specimens were prepared by injection molding the pellets thus obtained at the injection pressure of 500 kg/cm$^2$, cylinder temperature of 360~420° C. and mold temperature of 160~180° C. Various physical properties were by using these specimens, Table 7 illustrates results of measurements on tensile strength, flexural strength and modulus, Izod impact strength, heat distortion temperature and molding shrinkage.

COMPARATIVE EXAMPLES 12–22

Test specimens were prepared by carrying out the same procedures as described in Example 45–55 except that the carbon fiber was used in an amount outside the scope of the invention. The same properties as Examples 45–55 were measured by using these specimens and results are illustrated in Table 7, together with the results of Examples 45–55.

TABLE 5

| Example | diamine Component A (mol) | Component B (mol) | Acid anhydride Component C (mol) | Component D (mol) | η inh (dl/g) | Tg (°C.) | 5% Weight loss temperature (°C.) | Flow initiation temperature (°C.) | Melt viscosity (poise) |
|---|---|---|---|---|---|---|---|---|---|
| 19 | p-COP-M *1 0.035 | 4,4'-ODA *2 0.015 | PMDA *3 0.048 | 0 | 0.55 | 210 | 503 | 270 | 14000 (330° C.) |
| 20 | ↑ | 3,3'-DABP *2 0.015 | ↑ | ↑ | 0.49 | 204 | 499 | 265 | 9520 (↑) |
| 21 | p-COP-M *1 0.05 | 0 | PMDA 0.0336 | BPDA *5 0.0144 | 0.53 | 209 | 500 | 266 | 8840 (↑) |
| 22 | ↑ | ↑ | ↑ | BTDA *6 0.0144 | 0.61 | 211 | 493 | 275 | 13200 (↑) |
| 23 | p-COP-M 0.035 | 4,4'-ODA 0.015 | ↑ | BPDA 0.0144 | 0.56 | 202 | 498 | 260 | 7790 (↑) |
| 24 | p-COBN-M *7 0.035 | ↑ | PMDA 0.048 | 0 | 0.64 | 266 | 512 | 350 | 35200 (380° C.) |
| 25 | ↑ | 3,3'-DABP 0.015 | ↑ | ↑ | 0.66 | 251 | 501 | 335 | 12000 (↑) |
| 26 | p-COBN-M 0.05 | 0 | PMDA 0.0336 | BPDA 0.0144 | 0.59 | 248 | 498 | 330 | 9940 (↑) |
| 27 | ↑ | ↑ | ↑ | BTDA 0.0144 | 0.62 | 247 | 495 | 330 | 10000 (↑) |
| 28 | p-COBN-M 0.035 | 4,4'-ODA 0.015 | ↑ | BPDA 0.0144 | 0.61 | 242 | 489 | 325 | 10500 (↑) |
| 29 | p-PPBN-M *8 0.035 | ↑ | ODPA *9 0.048 | 0 | 0.88 | 209 | 516 | 370 | 29000 (400° C./5分) |
| 30 | ↑ | 3,3'-DABP 0.015 | ↑ | ↑ | 1.03 | 205 | 518 | 365 | 26500 (↑) |
| 31 | p-PPBN-M 0.05 | 0 | ↑ | BPDA 0.0144 | 0.98 | 210 | 519 | 370 | 30600 (↑) |
| 32 | ↑ | ↑ | ↑ | BPDA 0.0144 | 0.91 | 206 | 517 | 360 | 25400 (↑) |
| 33 | p-PPBN-M 0.035 | 4,4'-ODA 0.015 | ↑ | BPDA 0.0144 | 0.93 | 207 | 521 | 360 | 28000 (↑) |

*1 p-COP-M: 2,6-bis[4-(4-amino-α,α-dimethylbenzyl)phenoxy]pyridine
*2 4,4'-ODA: 4,4'-diaminodiphenyl ether
*3 PMDA: Pyromellitic dianhydride
*4 3,3'-DABP: 3,3'-diaminobenzophenone
*5 BPDA: 3,3',4,4'-Biphenyltetracarboxylic dianhydride
*6 BTDA: 3,3',4,4'-Benzophenonetetracarboxylic dianhydride
*7 p-COBN-M: 2,6-Bis[4-(4-amino-α,α-dimethylbenzyle)phenoxy]benzinitrile
*8 p-PPBN-M: 2,6-Bis[4-(4-aminophenoxy)phenoxy]benzonitrile
*9 ODPA: 3,3',4,4'-Diphenylethertetracarboxylic dianhydride

TABLE 6

| | Resin composition (wt. parts) | | | | | | | Notched Izod | Heat distortion | |
|---|---|---|---|---|---|---|---|---|---|---|
| | Resin (100) | | | | Tensile | Flexural | | impact | temperature | Molding |
| | Example | Diamine | Acid anhydride | Glass fiber | strength (kg/cm²) | strength (kg/cm²) | Modulas (kg/cm²) | strength (kg · cm/cm)) | (18.6 kg/cm²) (°C.) | shrinkage (%) |
| Example 34 | 13 | p-COP-M *1 | PMDA *2 | 30 | 1480 | 2150 | 59500 | 13.9 | 201 | 0.2 |
| | | | | 60 | 1530 | 2220 | 64900 | 14.8 | 204 | 0.2 |
| ↑ 35 | 14 | ↑ | BTDA *3 | 30 | 1440 | 2130 | 61300 | 13.8 | 198 | 0.3 |
| | | | | 60 | 1510 | 2210 | 65200 | 14.7 | 200 | 0.2 |
| ↑ 36 | 15 | ↑ | BPDA *4 | 30 | 1530 | 2240 | 65900 | 14.4 | 202 | 0.1 |
| | | | | 60 | 1590 | 2480 | 72100 | 17.2 | 203 | 0.2 |
| ↑ 37 | 19 | p-COP-M + 4,4'-ODA *5 | PMDA | 30 | 1490 | 2200 | 60200 | 14.3 | 202 | 0.3 |
| | | | | 60 | 1620 | 2430 | 69400 | 16.9 | 203 | 0.2 |
| Com. Example | 13 | p-COP-M | PMDA | 3 | 1050 | 1700 | 32500 | 6.2 | 198 | 0.8 |
| | | | | 120 | (strand-extrusion impossible) | | | | | |

TABLE 6-continued

| | | Resin composition (wt. parts) | | | | | | Notched Izod | Heat distortion | |
|---|---|---|---|---|---|---|---|---|---|---|
| | | Resin (100) | | | Tensile | Flexural | | impact | temperature | Molding |
| | Example | Diamine | Acid anhydride | Glass fiber | strength (kg/cm²) | strength (kg/cm²) | Modulas (kg/cm²) | strength (kg · cm/cm)) | (18.6 kg/cm²) (°C.) | shrinkage (%) |
| ↑ 1 | 14 | ↑ | BTDA | 3 | 1120 | 1620 | 34200 | 5.2 | 190 | 0.7 |
| ↑ 2 | | | | 120 | | | (strand-extrusion impossible) | | | |
| ↑ 3 | 15 | ↑ | BPDA | 3 | 1090 | 1600 | 31500 | 6.0 | 195 | 0.7 |
| ↑ 4 | | | | 120 | | | (strand-extrusion impossible) | | | |
|  | 19 | p-COP-M + 4,4'-ODA | PMDA | 3 | 1040 | 1630 | 35200 | 6.1 | 196 | 0.6 |
|  | | | | 120 | | | (strand-extrusion impossible) | | | |
| Example 38 | 4 | p-COBN-M *6 | PMDA | 30 | 1510 | 2170 | 57400 | 13.8 | 248 | 0.1 |
| | | | | 60 | 1630 | 2300 | 69500 | 15.3 | 253 | 0.2 |
| ↑ 39 | 5 | ↑ | BPDA | 30 | 1470 | 2210 | 58500 | 14.0 | 219 | 0.2 |
| | | | | 60 | 1590 | 2340 | 67500 | 16.3 | 222 | 0.2 |
| ↑ 40 | 6 | ↑ | BTDA | 30 | 1520 | 2240 | 63000 | 14.2 | 216 | 0.2 |
| | | | | 60 | 1700 | 2460 | 71200 | 16.4 | 224 | 0.3 |
| ↑ 41 | 24 | p-COBN-M + 4,4'-ODA | PMDA | 30 | 1490 | 2130 | 60000 | 14.4 | 244 | 0.3 |
| | | | | 60 | 1600 | 2310 | 71900 | 16.3 | 249 | 0.2 |
| Com. Example 5 | 4 | p-COBN-M *6 | PMDA | 3 | 1190 | 1430 | 32100 | 6.5 | 243 | 0.7 |
| | | | | 120 | | | (strand-extrusion impossible) | | | |
| ↑ 6 | 5 | ↑ | BPDA | 3 | 1020 | 1410 | 31900 | 6.0 | 217 | 0.6 |
| | | | | 120 | | | (strand-extrusion impossible) | | | |
| ↑ 7 | 6 | ↑ | BTDA | 3 | 990 | 1390 | 30000 | 5.9 | 212 | 0.8 |
| | | | | 120 | | | (strand-extrusion impossible) | | | |
| ↑ 8 | 24' | p-COBN-M + 4,4'-ODA | PMDA | 3 | 1010 | 1400 | 31500 | 6.2 | 215 | 0.7 |
| | | | | 120 | | | (strand-extrusion impossible) | | | |
| Example 42 | 8 | p-PPBN-M *7 | BPDA | 30 | 1510 | 2220 | 62200 | 14.5 | 224 | 0.1 |
| | | | | 60 | 1710 | 2460 | 70900 | 16.3 | 228 | 0.1 |
| ↑ 43 | 9 | ↑ | BTDA | 30 | 1480 | 2150 | 58800 | 14.1 | 226 | 0.3 |
| | | | | 60 | 1590 | 2410 | 67500 | 15.9 | 228 | 0.1 |
| ↑ 44 | 33 | p-PPBN-M + 4,4'-ODA | PMDA + BPDA | 30 | 1530 | 2260 | 62600 | 14.2 | 219 | 0.2 |
| | | | | 60 | 1740 | 2480 | 73900 | 16.6 | 221 | 0.2 |
| Com. Example 9 | 8 | p-PPBN-M | BPDA | 3 | 1120 | 1640 | 34900 | 6.8 | 238 | 0.6 |
| | | | | 120 | | | (strand-extrusion impossible) | | | |
| ↑ 10 | 9 | ↑ | BTDA | 3 | 1160 | 1590 | 33800 | 7.1 | 2.36 | 0.6 |
| | | | | 120 | | | (strand-extrusion impossible) | | | |
| ↑ 11 | 33 | p-PPBN-M + 4,4'-ODA | PMDA + BPDA | 3 | 1110 | 1570 | 34100 | 7.0 | 235 | 0.8 |
| | | | | 120 | | | (strand-extrusion impossible) | | | |

*1 p-COP-M: 2,6-bis[4-(4-amino-α,α-dimethylbenzyle)phenoxy]pyridine
*2 PMDA: Pyromellitic dianhydride
*3 BTDA: Benzophenonetetracarboxylic dianhydride
*4 BPDA: Biphenyltetracarboxylic dianhydride
*5 4,4'-ODA: 4,4'-diaminodiphenylether
*6 p-COBN-M: 2,6-Bis[4-(4-amino-α,α-dimethylbenzyl)phenoxy]benzonitrile
*7 p-PPBN-M: 2,6-Bis[4-(4-aminophenoxy)phenoxy]benzonitrile

TABLE 7

| | | Resin composition (wt. parts) | | | | | | Notched Izod | Heat distortion | |
|---|---|---|---|---|---|---|---|---|---|---|
| | | Resin (100) | | | Tensile | Flexural | | impact | temperature | Molding |
| | Example | Diamine | Acid anhydride | Glass fiber | strength (kg/cm²) | strength (kg/cm²) | Modulas (kg/cm²) | strength (kg · cm/cm)) | (18.6 kg/cm²) (°C.) | shrinkage (%) |
| Example 45 | 13 | p-COP-M *1 | PMDA *2 | 30 | 1530 | 2240 | 60900 | 14.1 | 202 | 0.1 |
| | | | | 60 | 1600 | 2390 | 68300 | 15.5 | 206 | 0.2 |
| ↑ 46 | 14 | ↑ | BTDA *3 | 30 | 1500 | 2240 | 65400 | 14.3 | 199 | 0.2 |
| | | | | 60 | 1660 | 2330 | 70700 | 16.0 | 202 | 0.2 |
| ↑ 47 | 15 | ↑ | BPDA *4 | 30 | 1540 | 2290 | 72000 | 15.5 | 203 | 0.1 |
| | | | | 60 | 1640 | 2400 | 78400 | 16.9 | 208 | 0.1 |
| ↑ 48 | 19 | p-COP-M + 4,4'-ODA *5 | PMDA | 30 | 1520 | 2190 | 63200 | 14.8 | 202 | 0.3 |
| | | | | 60 | 1660 | 2420 | 71100 | 16.5 | 204 | 0.1 |
| Com. Example 12 | 13 | p-COP-M | PMDA | 3 | 1010 | 1690 | 34900 | 7.3 | 196 | 0.9 |
| | | | | 120 | | | (strand-extrusion impossible) | | | |
| ↑ 13 | 14 | ↑ | BTDA | 3 | 1150 | 1640 | 37300 | 6.3 | 188 | 0.6 |
| | | | | 120 | | | (strand-extrusion impossible) | | | |
| ↑ | 15 | ↑ | BPDA | 3 | 1030 | 1700 | 33300 | 6.7 | 194 | 0.8 |

TABLE 7-continued

| | | Resin composition (wt. parts) | | | Tensile strength (kg/cm²) | Flexural strength (kg/cm²) | Modulas (kg/cm²) | Notched Izod impact strength (kg · cm/cm)) | Heat distortion temperature (18.6 kg/cm²) (°C.) | Molding shrinkage (%) |
|---|---|---|---|---|---|---|---|---|---|---|
| | | Resin (100) | | | | | | | | |
| | Example | Diamine | Acid anhydride | Glass fiber | | | | | | |
| 14 | 19 | p-COP-M + 4,4'-ODA | PMDA | 120 3 120 | 990 | 1620 | 34700 | (strand-extrusion impossible) 6.5 (strand-extrusion impossible) | 195 | 0.7 |
| 15 |
| Example 49 | 4 | p-COBN-M *6 | PMDA | 30 | 1550 | 2240 | 59900 | 14.2 | 249 | 0.2 |
| | | | | 60 | 1700 | 2360 | 71200 | 16.6 | 254 | 0.2 |
| ↑ 50 | 5 | ↑ | BPDA | 30 | 1590 | 2240 | 61600 | 15.0 | 218 | 0.2 |
| | | | | 60 | 1700 | 2480 | 69900 | 17.3 | 219 | 0.1 |
| ↑ 51 | 6 | ↑ | BTDA | 30 | 1530 | 2300 | 64300 | 14.8 | 215 | 0.2 |
| | | | | 60 | 1720 | 72200 | 17.2 | 222 | 0.2 | |
| ↑ 52 | 24 | p-COBN-M + 4,4'-ODA | PMDA | 30 | 1480 | 2100 | 62000 | 15.1 | 244 | 0.3 |
| | | | | 60 | 1640 | 2350 | 72400 | 17.2 | 248 | 0.1 |
| Com. Example 16 | 4 | p-COBN-M | PMDA | 3 120 | 1040 | 1500 | 33400 | (strand-extrusion impossible) 7.0 | 244 | 0.8 |
| ↑ 17 | 5 | ↑ | BPDA | 3 120 | 1100 | 1500 | 33600 | 6.4 (strand-extrusion impossible) | 215 | 0.8 |
| ↑ 18 | 6 | ↑ | BTDA | 3 120 | 980 | 1430 | 32100 | 6.6 (strand-extrusion impossible) | 211 | 0.9 |
| ↑ 19 | 24 | p-COBN-M + 4,4'-ODA | PMDA | 3 120 | 990 | 1420 | 32600 | 5.9 (strand-extrusion impossible) | 216 | 0.8 |
| Example 53 | 8 | p-PPBN-M *7 | BPDA | 30 | 1600 | 2190 | 62500 | 14.1 | 222 | 0.2 |
| | | | | 60 | 1740 | 2440 | 71200 | 17.0 | 229 | 0.2 |
| ↑ 54 | 9 | ↑ | BTDA | 30 | 1490 | 2210 | 60200 | 15.0 | 225 | 0.3 |
| | | | | 60 | 1600 | 2490 | 69400 | 17.3 | 229 | 0.2 |
| ↑ 55 | 33 | p-PPBN-M + 4,4'-ODA | PMDA + BPDA | 30 | 1550 | 2190 | 68200 | 14.8 | 220 | 0.1 |
| | | | | 60 | 1700 | 2440 | 75200 | 16.1 | 223 | 0.3 |
| Com. Example 20 | 8 | p-PPBN-M | BPDA | 3 120 | 1090 | 1710 | 35500 | 7.0 (strand-extrusion impossible) | 216 | 0.8 |
| ↑ 21 | 9 | ↑ | BTDA | 3 120 | 1080 | 1660 | 33500 | 7.4 (strand-extrusion impossible) | 226 | 0.7 |
| ↑ 22 | 33 | p-PPBN-M + 4,4'-ODA | PMDA + BPDA | 3 120 | 1130 | 1590 | 36200 | 7.3 (strand-extrusion impossible) | 228 | 0.7 |

*1 p-COP-M: 2,6-Bis[4-(4-amino-α,α-dimethylbenzyle)phenoxy]pyridine
*2 PMDA: pyromellitic dianhydride
*3 BTDA: Benzophenonetetracarboxylic dianhydride
*4 BPDA: Biphenyltetracarboxylic dianhydride
*5 4,4'-ODA: 4,4'-diaminodiphenylether
*6 p-COBN-M: 2,6-Bis[4-(4-amino-α,α-dimethylbenzyle)phenoxy]benzonitrile
*7 p-PPBN-M: 2,6-Bis[4-(4-aminophenoxy)phenoxy]benzonitrile

What is claimed is:

1. An aromatic diamino compound represented by the formula (3):

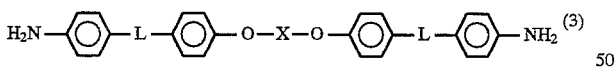

wherein L is an oxygen atom, carbonyl, isopropylidene or hexafluoroisopropylidene, and X is

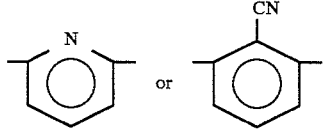

2. An aromatic diamino compound of claim 1 represented by the formula (3-1):

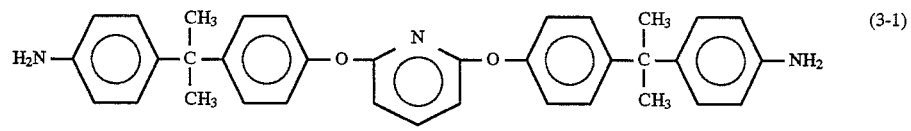

or represented by the formula (3-2):

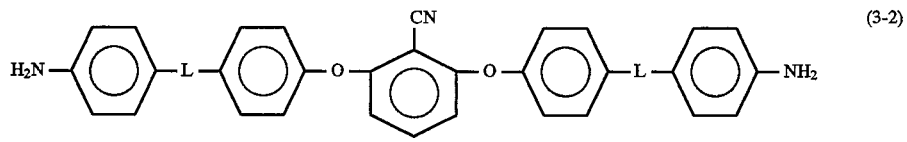

wherein L is the same as above.

3. A preparation process of an aromatic diamino compound represented by the formula (3):

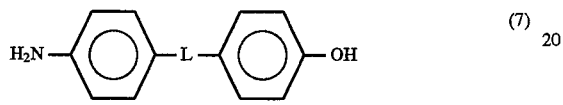

wherein L and X are the same as above, comprising carrying out condensation of a hydroxyl group containing aromatic amino compound represented by the formula (7):

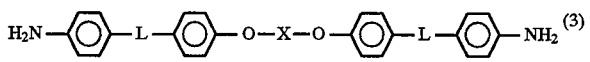

wherein L is an oxygen atom, carbonyl, isopropylidene or hexafluoroisopropylidene, with a compound represented by the formula (8):

$$Y-X-Y \quad (8)$$

Wherein X is

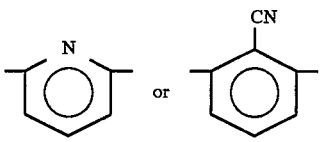

and Y is a halogen atom, in an aprotic polar solvent in the presence of a base.

* * * * *